United States Patent
Wu et al.

(10) Patent No.: US 7,211,624 B2
(45) Date of Patent: *May 1, 2007

(54) GOLF BALL LAYERS FORMED OF POLYURETHANE-BASED AND POLYUREA-BASED COMPOSITIONS INCORPORATING BLOCK COPOLYMERS

(75) Inventors: Shenshen Wu, North Dartmouth, MA (US); Murali Rajagopalan, South Dartmouth, MA (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 236 days.

This patent is subject to a terminal disclaimer.

(21) Appl. No.: 10/900,468

(22) Filed: Jul. 28, 2004

(65) Prior Publication Data

US 2004/0262808 A1 Dec. 30, 2004

Related U.S. Application Data

(63) Continuation-in-part of application No. 10/409,092, filed on Apr. 9, 2003, now Pat. No. 6,964,621, which is a continuation-in-part of application No. 10/066,637, filed on Feb. 6, 2002, now Pat. No. 6,582,326, which is a continuation of application No. 09/453,701, filed on Dec. 3, 1999, now Pat. No. 6,435,986, said application No. 10/409,092 is a continuation-in-part of application No. 10/228,311, filed on Aug. 27, 2002, now Pat. No. 6,835,794, and a continuation-in-part of application No. 09/951,963, filed on Sep. 13, 2001, now Pat. No. 6,635,716, which is a continuation-in-part of application No. 09/466,434, filed on Dec. 17, 1999, now Pat. No. 6,476,176.

(60) Provisional application No. 60/401,047, filed on Aug. 6, 2002.

(51) Int. Cl.
A63B 37/12 (2006.01)
C08L 75/00 (2006.01)

(52) U.S. Cl. .................... 525/92 C; 525/127; 525/128; 525/130; 473/378

(58) Field of Classification Search .................... None
See application file for complete search history.

(56) References Cited

U.S. PATENT DOCUMENTS

| | | | |
|---|---|---|---|
| 3,147,324 A | 9/1964 | Ward | 264/254 |
| 3,264,272 A | 8/1966 | Rees | 260/78.5 |
| 3,454,280 A | 7/1969 | Harrison et al. | 273/235 |
| 3,819,768 A | 6/1974 | Molitor | 260/897 B |
| 3,940,145 A | 2/1976 | Gentiluomo | 273/218 |
| 4,123,061 A | 10/1978 | Dusbiber | 273/220 |
| 4,323,247 A | 4/1982 | Keches et al. | 273/235 R |
| 4,431,193 A | 2/1984 | Nesbitt | 273/235 R |
| 4,526,375 A | 7/1985 | Nakade | 273/235 R |
| 4,560,168 A | 12/1985 | Aoyama | 273/232 |
| 4,884,814 A | 12/1989 | Sullivan | 273/235 R |
| 4,911,451 A | 3/1990 | Sullivan et al. | 273/235 R |
| 4,925,193 A | 5/1990 | Melvin et al. | 273/232 |
| 4,956,438 A | 9/1990 | Ruetman et al. | 528/60 |
| 4,960,281 A | 10/1990 | Aoyama | 273/232 |
| 5,006,297 A | 4/1991 | Brown et al. | 264/234 |
| 5,066,762 A | 11/1991 | Ohbuchi et al. | 528/85 |
| 5,071,578 A | 12/1991 | Ohkubo et al. | 252/62.54 |
| 5,248,878 A | 9/1993 | Ihara | 219/121.69 |
| 5,249,804 A | 10/1993 | Sanchez | 273/232 |
| 5,252,652 A | 10/1993 | Egashira et al. | 524/392 |
| 5,316,730 A | 5/1994 | Blake et al. | 422/73 |
| 5,334,673 A | 8/1994 | Wu | 273/235 R |
| 5,403,453 A | 4/1995 | Roth et al. | 204/164 |
| 5,456,972 A | 10/1995 | Roth et al. | 428/224 |
| 5,484,870 A | 1/1996 | Wu | 528/28 |
| 5,562,552 A | 10/1996 | Thurman | 473/379 |
| 5,575,477 A | 11/1996 | Hwang | 473/379 |
| 5,605,968 A | 2/1997 | Egashira et al. | 525/221 |
| 5,661,207 A | 8/1997 | Carlson et al. | 524/414 |
| 5,688,191 A | 11/1997 | Cavallaro et al. | 473/373 |
| 5,688,595 A | 11/1997 | Yamagishi et al. | 428/375 |
| 5,692,974 A | 12/1997 | Wu et al. | 473/377 |
| 5,697,856 A | 12/1997 | Moriyama et al. | 473/374 |
| 5,711,723 A | 1/1998 | Hiraoka et al. | 473/374 |
| 5,713,801 A | 2/1998 | Aoyama | 473/354 |
| 5,733,428 A | 3/1998 | Calabria et al. | 264/134 |
| 5,776,012 A | 7/1998 | Moriyama et al. | 473/372 |
| 5,779,561 A | 7/1998 | Sullivan | 473/373 |

(Continued)

FOREIGN PATENT DOCUMENTS

WO WO 01/43832 6/2001

OTHER PUBLICATIONS

U.S. Appl. No. 10/190,705, filed Jul. 9, 2002 entitled "Low Compression, Resilient Golf Balls With Rubber Core".

(Continued)

Primary Examiner—David J. Buttner
(74) Attorney, Agent, or Firm—Bingham McCutchen LLP

(57) ABSTRACT

Golf equipment having improved cut and shear resistance that includes a polyurea-based composition or polyurethane-based composition, preferably saturated and/or water resistant, formed of a prepolymer, a functionalized block copolymer, and optionally further cured or chain extended with a curing agent, where the prepolymer is incorporated at the terminal end of the functionalized block copolymer.

20 Claims, 7 Drawing Sheets

U.S. PATENT DOCUMENTS

| | | | |
|---|---|---|---|
| 5,779,563 A | 7/1998 | Yamagishi et al. | 473/371 |
| 5,792,008 A | 8/1998 | Kakiuchi | 473/354 |
| 5,800,286 A | 9/1998 | Kakiuchi et al. | 473/365 |
| 5,803,831 A | 9/1998 | Sullivan et al. | 473/374 |
| 5,816,944 A | 10/1998 | Asakura et al. | 473/372 |
| 5,820,488 A | 10/1998 | Sullivan et al. | 473/374 |
| 5,820,491 A | 10/1998 | Hatch et al. | 473/378 |
| 5,849,168 A | 12/1998 | Lutz | 264/755 |
| 5,872,185 A | 2/1999 | Ichikawa et al. | 525/93 |
| 5,877,264 A | 3/1999 | Logothetis et al. | 526/86 |
| 5,885,172 A | 3/1999 | Hebert et al. | 473/354 |
| 5,908,358 A | 6/1999 | Wu | 473/378 |
| 5,908,699 A | 6/1999 | Kim | 428/408 |
| 5,919,100 A | 7/1999 | Boehm et al. | 473/354 |
| 5,919,101 A | 7/1999 | Yokota et al. | 473/374 |
| 5,929,171 A | 7/1999 | Sano et al. | 525/261 |
| 5,929,189 A | 7/1999 | Ichikawa | 528/76 |
| 5,957,787 A | 9/1999 | Hwang | 473/379 |
| 5,965,669 A | 10/1999 | Cavallaro et al. | 525/221 |
| 5,977,264 A | 11/1999 | Ichikawa et al. | 525/329.9 |
| 5,981,654 A | 11/1999 | Rajagopalan | 525/66 |
| 5,981,658 A | 11/1999 | Rajagopalan et al. | 525/72 |
| 5,989,136 A | 11/1999 | Renard et al. | 473/376 |
| 5,993,968 A | 11/1999 | Umezawa et al. | 428/407 |
| 5,994,472 A | 11/1999 | Egashira et al. | 525/221 |
| 6,056,842 A | 5/2000 | Dalton et al. | 156/243 |
| 6,075,223 A | 6/2000 | Harrison | 219/121.85 |
| 6,099,415 A | 8/2000 | Lutz | 473/357 |
| 6,103,822 A | 8/2000 | Housel et al. | 524/840 |
| 6,120,392 A | 9/2000 | Kashiwagi et al. | 473/374 |
| 6,121,357 A | 9/2000 | Yokota | 524/406 |
| 6,126,558 A | 10/2000 | Higuchi et al. | 473/374 |
| 6,129,640 A | 10/2000 | Higuchi et al. | 473/374 |
| 6,129,881 A | 10/2000 | Puniello | 264/278 |
| 6,135,898 A | 10/2000 | Higuchi et al. | 473/374 |
| 6,149,535 A | 11/2000 | Bissonnette et al. | 473/354 |
| 6,150,462 A | 11/2000 | Rajagopalan et al. | 525/74 |
| 6,162,135 A | 12/2000 | Bulpett et al. | 473/373 |
| 6,174,247 B1 | 1/2001 | Higuchi et al. | 473/374 |
| 6,180,040 B1 | 1/2001 | Ladd et al. | 264/248 |
| 6,180,722 B1 | 1/2001 | Dalton et al. | 525/193 |
| 6,184,301 B1 | 2/2001 | Shindo et al. | 525/261 |
| 6,187,864 B1 | 2/2001 | Rajagopalan | 525/183 |
| 6,190,268 B1 | 2/2001 | Dewanjee | 473/370 |
| 6,207,784 B1 | 3/2001 | Rajagopalan | 528/71 |
| 6,210,292 B1 | 4/2001 | Higuchi et al. | 473/374 |
| 6,210,294 B1 | 4/2001 | Wu | 473/372 |
| 6,213,896 B1 | 4/2001 | Higuchi et al. | 473/374 |
| 6,213,898 B1 | 4/2001 | Ogg | 473/383 |
| 6,231,460 B1 | 5/2001 | Higuchi et al. | 473/374 |
| 6,235,230 B1 | 5/2001 | Puniello | 264/278 |
| 6,241,622 B1 | 6/2001 | Gobush et al. | 473/199 |
| 6,241,625 B1 | 6/2001 | Yokota et al. | 473/373 |
| 6,244,978 B1 | 6/2001 | Higuchi et al. | 473/374 |
| 6,248,028 B1 | 6/2001 | Higuchi et al. | 473/374 |
| 6,248,804 B1 | 6/2001 | Lutz | 523/160 |
| 6,267,692 B1 | 7/2001 | Higuchi et al. | 473/365 |
| 6,267,694 B1 | 7/2001 | Higuchi et al. | 473/374 |
| 6,286,364 B1 | 9/2001 | Aoyama et al. | 73/65.03 |
| 6,287,218 B1 | 9/2001 | Ohama | 473/377 |
| 6,290,615 B1 | 9/2001 | Ogg | 473/377 |
| 6,291,592 B1 | 9/2001 | Bulpett et al. | 525/248 |
| 6,299,551 B1 | 10/2001 | Higuchi et al. | 473/374 |
| 6,309,313 B1 * | 10/2001 | Peter | 473/378 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,371,870 B1 | 4/2002 | Calabria et al. | 473/370 |
| 6,379,138 B1 | 4/2002 | Puniello et al. | 425/116 |
| 6,383,092 B1 | 5/2002 | Ogg | 473/378 |
| 6,386,992 B1 | 5/2002 | Harris et al. | 473/371 |
| 6,409,615 B1 | 6/2002 | McGuire et al. | 473/383 |
| 6,435,986 B1 | 8/2002 | Wu et al. | 473/378 |
| 6,458,895 B1 | 10/2002 | Wrigley et al. | 525/248 |
| 6,462,303 B1 | 10/2002 | Brown | 219/121.69 |
| 6,465,578 B1 | 10/2002 | Bissonnette et al. | 525/261 |
| 6,476,130 B1 | 11/2002 | Rajagopalan et al. | 525/74 |
| 6,488,591 B1 | 12/2002 | Gobush et al. | 473/199 |
| 6,500,073 B1 | 12/2002 | Pelletier et al. | 473/199 |
| 6,500,495 B2 | 12/2002 | Lutz | 427/500 |
| 6,503,156 B1 | 1/2003 | Sullivan | 473/374 |
| 6,506,130 B2 | 1/2003 | Sullivan | 473/374 |
| 6,610,812 B1 | 8/2003 | Wu et al. | 528/60 |
| 6,629,898 B2 | 10/2003 | Nardacci | 473/373 |
| 6,705,959 B2 | 3/2004 | Morgan et al. | 473/383 |
| 2001/0009310 A1 | 7/2001 | Hebert et al. | |
| 2001/0011045 A1 | 8/2001 | Takemura et al. | |
| 2001/0016522 A1 | 8/2001 | Watanabe et al. | |
| 2001/0018374 A1 | 8/2001 | Ichikawa et al. | |
| 2001/0018375 A1 | 8/2001 | Hayashi et al. | |
| 2001/0019971 A1 | 9/2001 | Hayashi et al. | |
| 2001/0031669 A1 | 10/2001 | Ohama | |
| 2001/0031673 A1 | 10/2001 | Watanabe | |
| 2002/0025862 A1 | 2/2002 | Sullivan et al. | |
| 2002/0028885 A1 | 3/2002 | Sullivan et al. | |
| 2002/0082358 A1 | 6/2002 | Ohira et al. | |
| 2003/0032503 A1 | 2/2003 | Yokota | |
| 2003/0078348 A1 | 4/2003 | Rajagopalan et al. | |
| 2003/0106442 A1 | 6/2003 | Gosetti | |
| 2003/0114225 A1 | 6/2003 | Dalton et al. | |
| 2003/0119989 A1 | 6/2003 | Ladd et al. | |
| 2003/0158001 A1 | 8/2003 | Morgan et al. | |
| 2003/0212240 A1 | 11/2003 | Wu et al. | |
| 2003/0232666 A1 | 12/2003 | Sullivan | |
| 2004/0254298 A1 * | 12/2004 | Kim et al. | 525/92 C |
| 2005/0009638 A1 * | 1/2005 | Wu et al. | 473/354 |
| 2005/0009642 A1 * | 1/2005 | Wu et al. | 473/371 |
| 2005/0202904 A1 * | 9/2005 | Takesue et al. | 473/378 |

OTHER PUBLICATIONS

U.S. Appl. No. 10/167,744, filed Jun. 13, 2002 entitled "Golf Ball With Multiple Cover Layers".

U.S. Appl. No. 10/138,304, filed May 6, 2002 entitled "Golf Ball Incorporating Grafted Metallocene Catalyzed Polymer Blends".

U.S. Appl. No. 10/012,538, filed Dec. 12, 2001, entitled "Method of Forming Indicia On A Golf Ball".

U.S. Appl. No. 09/989,191, filed Nov. 21, 2001, entitled "Golf Ball Dimples With A Catenary Curve Profile".

U.S. Appl. No. 09/842,829, filed Apr. 27, 2001, entitled "All Rubber Golf Ball With Hoop-Stress Layer".

U.S. Appl. No. 09/841,910, filed Apr. 27, 2001, entitled "Multilayer Golf Ball With Hoop-Stress Layer".

U.S. Appl. No. 09/742,435, filed Dec. 22, 2000, entitled "Split Vent Pin For Injection Molding".

U.S. Appl. No. 09/717,136, filed Nov. 22, 2000, entitled "Method of Making Golf Balls".

U.S. Appl. No. 09/442,845, filed Nov. 18, 1999, entitled "Mold for a Golf Ball" (Japanese Abstract submitted).

Grant & Hackh's Chemical Dictionary 5th Edition, p. 118, Feb. 1990.

John A. Schey, Introduction to Manufacturing Processes 410 (Anne Duffy, ed., McGraw-Hill 2d ed. 1987) (1977).

* cited by examiner

GOLF BALL LAYERS FORMED OF POLYURETHANE-BASED AND POLYUREA-BASED COMPOSITIONS INCORPORATING BLOCK COPOLYMERS

CROSS-REFERENCE TO RELATED APPLICATIONS

This application is a continuation-in-part of U.S. patent application Ser. No. 10/409,092, filed Apr. 9, 2003, now U.S. Pat. No. 6,964,621, which is a continuation-in-part of U.S. patent application Ser. No. 10/066,637, filed Feb. 6, 2002, now U.S. Pat. No. 6,582,326, which is a continuation of U.S. patent application Ser. No. 09/453,701, filed Dec. 3, 1999, now U.S. Pat. No. 6,435,986; and also a continuation-in-part of U.S. patent application Ser. No. 10/228,311, filed Aug. 27, 2002, now U.S. Pat. No. 6,835,794, which is a continuation-in-part of U.S. patent application Ser. No. 09/466,434, filed Dec. 17, 1999, now U.S. Pat. No. 6,476,176, and a continuation-in-part of U.S. patent application Ser. No. 09/951,963, filed Sep. 13, 2001, now U.S. Pat. No. 6,635,716, and also claims priority to U.S. Patent Provisional Application No. 60/401,047, filed Aug. 6, 2002. The entire disclosures of these applications are incorporated by reference herein.

FIELD OF THE INVENTION

The invention relates to golf equipment including polyurethane-based compositions incorporating block copolymers, polyurea-based compositions incorporating block copolymers, and mixtures thereof. In particular, the present invention is directed to golf equipment including compositions formed from the reaction product of an isocyanate and a functionalized block copolymer. In addition, the compositions of the present invention may be formed from the reaction product of a prepolymer, which is based on an isocyanate and a polyol or amine, and a functionalized block copolymer. The compositions of the invention may also be formed by reacting an excess of prepolymer, which is based on an isocyanate and a polyol or amine, with a functionalized block copolymer to form an intermediate prepolymer having the block copolymer portion capped with isocyanate groups at each end, which is then reacted with a curing agent to form a polyurethane-based or polyurea-based composition.

BACKGROUND OF THE INVENTION

Golf equipment, i.e., clubs and balls, are formed from a variety of compositions. For example, golf ball covers are formed from a variety of materials, including balata and ionomer resins. Balata is a natural or synthetic trans-polyisoprene rubber. Balata covered balls are favored by more highly skilled golfers because the softness of the cover allows the player to achieve spin rates sufficient to more precisely control ball direction and distance, particularly on shorter shots.

However, balata covered balls are easily damaged, and thus lack the durability required by the average golfer. Accordingly, alternative cover compositions have been developed in an attempt to provide balls with spin rates and a feel approaching those of balata covered balls, while also providing a golf ball with a higher durability and overall distance.

Ionomer resins have, to a large extent, replaced balata as a cover material. Chemically, ionomer resins are a copolymer of an olefin and an $\alpha$, $\beta$-ethylenically-unsaturated carboxylic acid having 10 to 90 percent of the carboxylic acid groups neutralized by a metal ion, as disclosed in U.S. Pat. No. 3,264,272. Commercially available ionomer resins include, for example, copolymers of ethylene and methacrylic or acrylic acid, neutralized with metal salts. Examples of commercially available ionomer resins include, but are not limited to, SURLYN® from DuPont de Nemours and Company, and ESCOR® and IOTEK® from Exxon Corporation. These ionomer resins are distinguished by the type of metal ion, the amount of acid, and the degree of neutralization.

U.S. Pat. Nos. 3,454,280, 3,819,768, 4,323,247, 4,526,375, 4,884,814, and 4,911,451 all relate to the use of SURLYN®-type compositions in golf ball covers. However, while SURLYN® covered golf balls, as described in the preceding patents, possess virtually cut-proof covers, the spin and feel are inferior compared to balata covered balls.

Polyurethanes have also been recognized as useful materials for golf ball covers since about 1960. U.S. Pat. No. 3,147,324 is directed to a method of making a golf ball having a polyurethane cover. The resulting golf balls are durable, while at the same time maintaining the "feel" of a balata ball.

Various companies have investigated the usefulness of polyurethane as a golf ball cover material. U.S. Pat. No. 4,123,061 teaches a golf ball made from a polyurethane prepolymer formed of polyether with diisocyanate that is cured with either a polyol or an amine-type curing agent. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a glycol.

Unlike SURLYN® covered golf balls, polyurethane golf ball covers can be formulated to possess the soft "feel" of balata covered golf balls. However, golf ball covers made from polyurethane have not, to date, fully matched SURLYN® golf balls with respect to resilience or the rebound of the golf ball cover, which is a function of the initial velocity of a golf ball after impact with a golf club.

Furthermore, because the polyurethanes used to make the covers of such golf balls generally contain an aromatic component, e.g., aromatic diisocyanate, polyol, or polyamine, they are susceptible to discoloration upon exposure to light, particularly ultraviolet (UV) light. To slow down the discoloration, light and UV stabilizers, e.g., TINUVIN® 770, 765, and 328, are added to these aromatic polymeric materials. However, to further ensure that the covers formed from aromatic polyurethanes do not appear discolored, the covers are painted with white paint and then covered with a clear coat to maintain the white color of the golf ball. The application of a uniform white pigmented coat to the dimpled surface of the golf ball is a difficult process that adds time and costs to the manufacture of a golf ball.

In addition, while certain polyols provide more stability to the polyurethane polymer in terms of moisture resistance, polyurethanes remain highly susceptible to changes in their physical properties due to absorption of moisture. To avoid moisture absorption, manufacturers have attempted to use moisture barrier layers, e.g., U.S. Pat. No. 5,820,488, located between the core and the cover. However, there still remains a need for materials that are resistant to absorption of moisture suitable for forming a golf ball component.

Polyureas have also been proposed as cover materials for golf balls. For instance, U.S. Pat. No. 5,484,870 discloses a polyurea composition comprising the reaction product of an organic isocyanate and an organic amine, each having at least two functional groups. Once these two ingredients are combined, the polyurea is formed, and thus the ability to vary the physical properties of the composition is limited. Like polyurethanes, polyureas are not completely comparable to SURLYN® golf balls with respect to resilience or the rebound or damping behavior of the golf ball cover.

Therefore, there remains a continuing need for golf equipment having soft components that provide improved resilience, increased cut, scratch and abrasion resistance, moisture resistance, and enhanced adherence without adversely affecting overall performance characteristics of the golf balls. Thus, it would be advantageous to provide a composition that combines the cut and scratch resistance with improved resistance to discoloration and moisture that are suitable for forming golf ball components and other golf-related equipment.

SUMMARY OF THE INVENTION

The present invention is generally directed to golf equipment having at least a portion formed of a polyurea composition. In one embodiment, the present invention is directed to one-piece golf balls including polyurea. In another embodiment, the compositions of the invention are used in two-piece and multi-component, e.g., three-piece, four-piece, etc. golf balls including at least one cover layer and a core, wherein at least one cover layer includes at least one polyurea, as well as multi-component golf balls including cores and/or covers having two or more layers, wherein at least one such layer(s) is formed of at least one polyurea.

For example, one aspect of the invention is directed to a golf ball having a core and a cover, wherein the cover is formed from a reactive product composition including an isocyanate and an amine-terminated compound selected from the group consisting of:

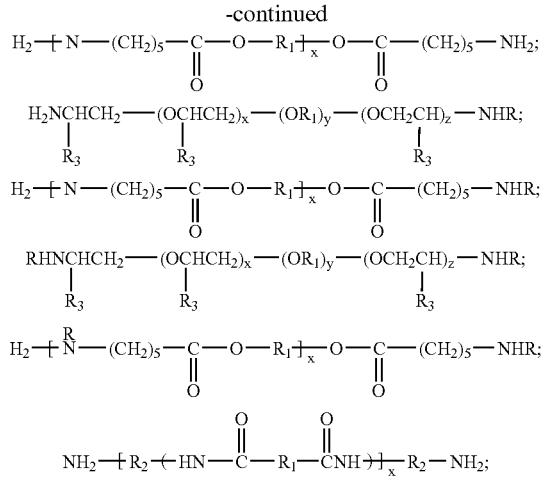

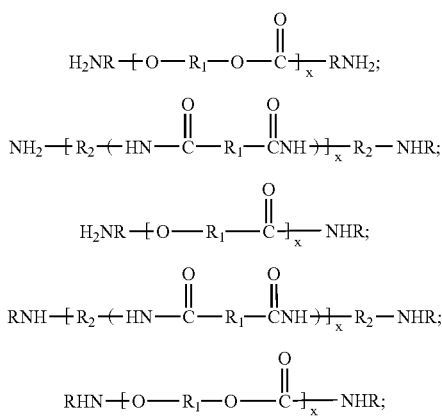

and mixtures thereof, wherein n, x, y, and z are about 1 or greater, preferably about 1 to about 20, wherein R is an alkyl group having about 1 to about 20 carbon atoms, preferably about 1 to about 12 carbon atoms, a phenyl group; a cyclic group; or mixtures thereof, wherein $R_1$ and $R_2$ are alkylene groups having about 1 to about 20 carbon atoms, preferably about 1 to about 12 carbon atoms, phenylene groups, cyclic groups, or mixtures thereof, and wherein $R_3$ is a hydrogen, a methyl group, or a mixture thereof.

In one embodiment, the composition includes linkages having the general formulae:

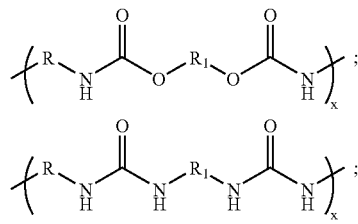

or mixtures thereof, wherein x is the chain length, i.e., about 1 or greater, and wherein R and $R_1$ are straight chain or branched hydrocarbon chains having about 1 to about 20 carbons. In another embodiment, the composition includes only linkages having the general formula:

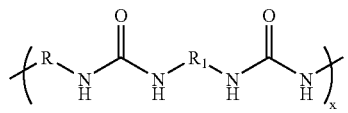

wherein x is the chain length, i.e., about 1 or greater, and wherein R and $R_1$ are straight chain or branched hydrocarbon chains having about 1 to about 20 carbons.

The composition may further include a curing agent selected from the group consisting of hydroxy-terminated curing agents, amine-terminated curing agents, and mixtures thereof. In one embodiment, the amine-terminated curing agent is a secondary diamine curing agent. In another embodiment, the amine-terminated curing agents are selected from the group consisting of ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; N,N'-diisopropyl-isophorone diamine; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylenediamine; diaminocyclohexane; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; polyoxypropylene diamine; propylene oxide-based triamine; 3,3'-dimethyl-4,4'-diaminocyclohexylmethane; and mixtures thereof.

The cover preferably has a difference in yellowness index (ΔYI) of about 12 or less after 5 days of ultraviolet light exposure. In addition, the cover preferably has a difference in b chroma dimension of about 6 or less after 5 days of ultraviolet light exposure.

In one embodiment, the composition may include at least one density-adjusting filler.

The present invention is also directed to a golf ball including a core, a layer, which may include at least one thermoplastic or thermoset non-ionomeric material, disposed about the core to create an inner ball, and a cover cast onto the inner ball, wherein the cover includes a light stable polyurea material including at least one isocyanate, at least one amine-terminated compound, and at least one curing agent comprising a hydroxy-terminated curing agent, an amine-terminated curing agent, or a mixture thereof. The amine-terminated compound may be selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof. In one embodiment, the amine-terminated compound comprises primary amines, secondary amines, triamines, or combinations thereof.

In another embodiment, the cover has a thickness of about 0.02 inches to about 0.035 inches. In yet another embodiment, the layer has a first Shore D hardness and the cover has a second Shore D hardness, and wherein the ratio of second Shore D hardness to the first Shore D hardness is about 0.7 or less. In still another embodiment, the core has a diameter of about 1.55 or greater.

The inner ball may include a moisture barrier layer. In one embodiment, the inner ball is surface treated.

The present invention also relates to a golf ball including a core, an intermediate layer having a hardness of about 60 Shore D or greater, and a cover formed of a polyurea material comprising at least one isocyanate and at least one amine-terminated compound, wherein the cover has a hardness of about 30 Shore D to about Shore 60, and wherein the golf ball has a COR of about 0.800 or greater.

The amine-terminated compound is selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof. In addition, the polyurea material may further include a curing agent selected from the group consisting of a hydroxy-terminated curing agent, an amine-terminated curing agent, and mixtures thereof.

In one embodiment, the ratio of the cover hardness to the intermediate layer hardness is about 0.7 or less. In another embodiment, the cover has a thickness of about 0.2 inches to about 0.035 inches.

In still another embodiment, the intermediate layer includes an ionomeric material. In an alternate embodiment, the intermediate layer comprises a thermoset non-ionomeric material, a thermoplastic non-ionomeric material, or mixtures thereof.

The present invention is also directed to a golf ball including at least a cover and at least one core layer wherein the cover is formed from a composition including at least one polyurea composition formed from a polyurea prepolymer, i.e., an isocyanate and an amine-terminated compound, cured with a curing agent.

The present invention is further directed to a golf ball including a cover, a core and at least one intermediate layer interposed between the cover and an outermost core layer, wherein the intermediate layer is formed from a composition including a polyurea prepolymer, i.e., an isocyanate and an amine-terminated compound, cured with a curing agent The present invention is yet further directed to a golf ball including a cover, a core, and at least one intermediate layer interposed between the cover and the core, wherein the outermost cover layer and at least one intermediate layer are both formed from a polyurea composition including a polyurea prepolymer, i.e., an isocyanate and an amine-terminated compound, cured with a curing agent.

In another embodiment of the present invention, the cover preferably includes from about 1 to about 100 weight percent of the polyurea, with the remainder of the cover, if any, including at least one other polymer known to one of ordinary skill in the art. In another embodiment, the cover preferably includes from about 1 to about 100 weight percent of the polyurea, with the remainder of the cover, if any, including one or more compatible, resilient polymers such as would be known to one of ordinary skill in the art.

The invention is further directed to a golf ball including at least one light stable cover layer formed from a composition including at least one polyurea formed from a polyurea prepolymer and a curing agent. In one embodiment, the polyurea prepolymer includes at least one isocyanate and at least one amine-terminated compound.

In this aspect of the invention, the isocyanate is saturated, and selected from the group consisting of ethylene diisocyanate; propylene-1,2-diisocyanate; tetramethylene diisocyanate; tetramethylene-1,4-diisocyanate; 1,6-hexamethylene diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophoronediisocyanate; triisocyanate of HDI; triisocyanate of 2,2,4-trimethyl-1,6-hexane diisocyanate; dicyclohexylmethane diisocyanate; 4,4'-dicyclohexylmethane diisocyanate; 2,4-hexahydrotoluene diisocyanate; 2,6-hexahydrotoluene diisocyanate; and mixtures thereof. The saturated diisocyanate is preferably selected from the group consisting of isophoronediisocyanate, 4,4'-dicyclohexylmethane diisocyanate, 1,6-hexamethylene diisocyanate, or a combination thereof.

In another embodiment, the isocyanate is an aromatic aliphatic isocyanate selected from the group consisting of meta-tetramethylxylene diisocyanate; para-tetramethylxylene diisocyanate; trimerized isocyanurate of a polyisocyanate; dimerized uretdione of a polyisocyanate; a modified polyisocyanate; and mixtures thereof.

The amine-terminated compound may be a polyether amine selected from the group consisting of polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof. In one embodiment, the polyether amine has a molecular weight of about 1000 to about 3000.

The curing agent may be selected from the group consisting of hydroxy-terminated curing agents, amine-terminated curing agents, and mixtures thereof. In one embodiment, the hydroxy-terminated curing agents are selected from the group consisting of ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy) ethoxy]cyclohexane; 1,3-bis-{2-[2-(2-hydroxyethoxy)ethoxy]ethoxy} cyclohexane; trimethylolpropane; polytetramethylene ether glycol, preferably having a molecular weight from about 250 to about 3900; and mixtures thereof.

The amine-terminated curing agents may be selected from the group consisting of ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-(bis-propylamine); monoethanolamine, diethanolamine; triethanolamine; monoisopropanolamine, diisopropanolamine; isophoronediamine; and mixtures thereof.

In one embodiment, the composition further includes a catalyst selected from the group consisting of a bismuth catalyst, zinc octoate, bis-butyltin dilaurate, bis-butyltin diacetate, tin (II) chloride, tin (IV) chloride, bis-butyltin dimethoxide, dimethyl-bis[1-oxonedecyl)oxy]stannane, di-n-octyltin bis-isooctyl mercaptoacetate, triethylenediamine, triethylamine, tributylamine, oleic acid, acetic acid; delayed catalysts, and mixtures thereof. The catalyst may be present from about 0.005 percent to about 1 percent by weight of the composition.

In another embodiment, the cover layer has a difference in yellowness index ($\Delta YI$) of about 12 or less after 5 days of ultraviolet light exposure. In yet another embodiment, the cover layer has a difference in b* dimension of about 6 or less after 5 days of ultraviolet light exposure.

In this aspect of the invention, the cover layer may be formed from casting, injection molding, compression molding, reaction injection molding, and mixtures thereof, as well as other polymer processes known to those of ordinary skill in the art.

The present invention is also directed to a golf ball including a core, a layer disposed about the core forming a center, and a cover cast onto the center, wherein the cover comprises a light stable polyurea material comprising at least an isocyanate and an amine-terminated compound, and at least one of a hydroxy-terminated curing agent, a amine-terminated curing agent, or a mixture thereof.

In one embodiment, the layer includes ionomers, polyamides, highly neutralized polymers, polyesters, polycarbonates, polyimides, polyolefins, acid copolymers, polyurethanes, vinyl resins, acrylic resins, polyphenylene oxide resins, metallocene-catalyzed polymers, and mixtures thereof. In another embodiment, the layer is a moisture barrier layer.

In yet another embodiment, the cover has a thickness of about 0.02 inches to about 0.035 inches. In addition, the layer preferably has a first Shore D hardness and the cover has a second Shore D hardness, wherein the ratio of second Shore D hardness to the first Shore D hardness is about 0.7 or less.

The core may include polybutadiene and may have a diameter of about 1.55 or greater. In one embodiment, the core includes a cis-to-trans catalyst, a resilient polymer component, and a free radical source. The cis-to-trans catalyst may include an organosulfur component, preferably including a metal salt, a Group VIA component, an inorganic sulfide component, an aromatic organic compound, or mixtures thereof.

In one embodiment, at least one of the core, the layer, the cover, or combinations thereof comprise a density-adjusting filler.

The present invention is also directed to a method of forming a golf ball including the steps of providing a golf ball center, mixing a polyurea prepolymer and at least one curing agent to form a castable reactive polyurea liquid material, filling a first set of mold halves with a first amount of the material, lowering the center into the first set of mold halves after a first predetermined time, wherein the center is held by vacuum for a second predetermined time, and wherein the second predetermined time is sufficient for complete exothermic reaction of the first amount of material, releasing the center from the vacuum providing a partially covered center, filling a second set of mold halves with a second amount of the material, wherein the first and second amounts are substantially similar, and wherein an exothermic reaction of the second amount commences, and mating the second set of mold halves with the partially covered center, wherein the exothermic reaction of the second amount concludes.

In one embodiment, the first predetermined time is about 40 seconds to about 100 seconds. In another embodiment, the second predetermined time is about 4 seconds to about 12 seconds.

The polyurea prepolymer may include at least one isocyanate and at least one amine-terminated compound. In one embodiment, the step of mixing a polyurea prepolymer and at least one curing agent further includes mixing at least one triol or at least one tetraol, or mixtures thereof. In another embodiment, the step of mixing a polyurea prepolymer and at least one curing agent further includes mixing at least one catalyst, at least one light stabilizer, at least one defoaming agent, at least one acid functionalized moiety, or combinations thereof.

In yet another embodiment, the step of providing a golf ball center includes the steps of providing a golf ball core and forming a layer disposed about the golf ball core. In still another embodiment, the golf ball core includes a polybutadiene reaction product, wherein the core has a diameter of about 1.55 inches or greater, and wherein the layer has a thickness of about 0.02 inches to about 0.035 inches.

The present invention is also directed to a golf ball having at least one layer, formed of a water resistant polyurea or polyurethane elastomer. In particular, this aspect of the invention relates to a golf ball having at least one layer, such layer(s) being formed of a water resistant polyurea or polyurethane. In one embodiment, a one-piece golf ball is formed from a water resistant elastomer. In other embodiments, multi-layer balls are formed with at least a portion including the water resistant elastomers of the invention. In this aspect of the invention, the intermediate layer, cover layer(s), and/or core may be formed, as a whole or in part, with the water resistant elastomeric composition.

The water resistant polyurethane elastomers of the invention are the reaction product of at least one isocyanate, at least one polyol and at least one curing agent, wherein the polyol and/or the curing agent is based on a hydrophobic backbone. The water resistant polyurea elastomer is the reaction product of at least one isocyanate and at least one amine-terminated polyol, wherein the amine-terminated polyol and/or the curing agent is based on a hydrophobic backbone.

The water resistant elastomers of the present invention may be used in forming any portion of a golf ball, portions of golf clubs, shoes, or bags. When used in a golf ball, the water resistant elastomer preferably is included in a layer composition from about 1 percent to about 100 percent by weight of the layer composition.

In one embodiment, a golf ball of the invention includes a core and a cover, wherein at least a portion of the golf ball is formed from a water resistant polyurea composition including an isocyanate, an amine-terminated compound comprising a hydrophobic backbone, and a curing agent. The amine-terminated compound may include at least one of an unsaturated amine-terminated hydrocarbon, a saturated amine-terminated hydrocarbon, or mixtures thereof. In addition, the curing agent may be selected from the group consisting of hydroxy-terminated curing agents, amine-terminated curing agents, and mixtures thereof. In another embodiment, the curing agent is selected from the group consisting of primary diamine curing agents, secondary diamine curing agents, triamines, and combinations thereof, preferably a secondary diamine curing agent. In this aspect of the invention, the golf ball preferably has a weight gain of about 0.15 grams or less after a seven week storage period in 100 percent humidity at 72° F. In one embodiment, the golf ball has a weight gain of about 0.09 grams or less after a seven week storage period in 100 percent humidity at 72° F. The water resistant polyurea composition may also include at least one density-adjusting filler. And, in one embodiment, the water resistant polyurea composition consists of only urea linkages.

In a second embodiment of this aspect of the invention, a golf ball may include a core having a diameter of about 1.55 or greater, an intermediate layer disposed about the core to create a center, and a cover having a thickness of about 0.02 inches to about 0.035 inches disposed about the center, wherein the cover includes a water resistant polyurea material including at least one amine-terminated compound comprising a hydrophobic backbone and at least one isocyanate. In this embodiment, the golf ball preferably has a weight gain of about 0.05 grams or less after a seven week storage period in 100 percent humidity at 72° F.

In one embodiment, the amine-terminated compound includes at least one amine-terminated hydrocarbon. In another embodiment, the cover has first hardness and the intermediate layer has a second hardness greater than the first hardness. For example, the first hardness may be about 40 Shore D to about 55 Shore D and the second hardness may be about 60 Shore D or greater. Also, the core may include a first layer and a second layer. In one embodiment, the core hardness is about 60 Shore D or less.

In a third embodiment of this aspect of the invention, a golf ball may include a water resistant polyurea composition including at least one amine-terminated compound having at least one hydrophobic backbone, wherein the golf ball has a weight gain of about 0.15 grams or less and a size gain of about 0.001 inches or less after a seven week storage period in 100 percent humidity at 72° F. In one embodiment, the water resistant polyurea composition further includes an isocyanate and a curing agent. In another embodiment, the curing is selected from the group consisting of ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof, 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro- 2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; and mixtures thereof. In this aspect of the invention, the golf ball may have a polybutadiene core.

Golf balls of the invention may also be formed having at least a cover and at least one core layer, wherein at least one water resistant polyurethane elastomer is included in the cover of the golf ball. In another embodiment, the golf ball has a cover, a core, and at least one intermediate layer interposed between the cover and an outermost core layer, wherein the intermediate layer is formed from a composition including at least one water resistant polyurethane elastomer. In yet another embodiment, the golf ball has a cover, a core, and at least one intermediate layer interposed between the cover and the core, wherein the outermost cover layer and at least one intermediate layer are both formed from a composition including at least one water resistant polyurethane elastomer.

The water resistant polyurethane elastomers used in forming the golf balls of the present invention can be formed in accordance with the teachings described in U.S. Pat. Nos. 5,334,673 and 5,733,428, which are incorporated by reference in their entirety herein.

The present invention is also directed to a golf ball including a core and a cover, wherein at least a portion of the golf ball, e.g., a cover, is formed from a composition including an isocyanate, which may be saturated, and a block copolymer, wherein the block copolymer includes an $A_x$-$B_y$-$A_z$ block and includes at least one functional group at a terminal end of the $A_x$-$B_y$-$A_z$ block, and wherein x, y, and z are independently 1 or greater. In one embodiment, A includes an olefin and B includes a diene. In another embodiment, the diene is butadiene. The olefin may be selected from the group consisting of ethylene, propylene, styrene, and mixtures thereof.

In this aspect of the invention, the block copolymer may include styrene-butadiene-styrene block copolymer. In one embodiment, the at least one functional group includes a hydroxyl group, an amino group, a thiol group, an epoxy group, an anhydride group, or a combination thereof. The composition may include at least one density-adjusting filler, nanoparticles, or a mixture thereof.

The present invention may also include a golf ball including a core and a cover, wherein at least a portion of the golf ball, e.g., a cover, is formed from an isocyanate and a block copolymer including at least one functional group at a terminal end of the block copolymer, wherein the block copolymer includes an $A_x$-$B_y$ block, and wherein x and y are independently 1 or greater. In one embodiment, A includes an olefin and B includes a diene. In another embodiment, A includes styrene and B includes butadiene. Furthermore, the functional group can include at least one of a hydroxy group, an amino group, a thiol group, an epoxy group, an anhydride group, or a combination thereof.

In this aspect of the invention, the cover may include an inner cover layer and an outer cover layer. And, in one embodiment, the inner cover layer includes a thermoplastic material. Furthermore, the portion of the golf ball may include the outer cover layer.

The present invention also relates to a golf ball including a core and a cover, wherein the cover is formed from a composition including an isocyanate and a styrene-butadiene-styrene block copolymer having functional groups at the terminal ends of the block copolymer. The golf ball may also include an intermediate layer. In one embodiment, the intermediate layer includes a thermoplastic material. In another embodiment, the functional groups are selected from the group consisting of hydroxy groups, amino groups, thiol groups, epoxy groups, anhydride groups, and combinations thereof. In still another embodiment, the cover has an inner cover layer having a hardness of about 50 Shore D to about 70 Shore D and an outer cover layer having a hardness of about 30 Shore D to about 70 Shore D.

Another aspect of the invention relates to a golf ball including a core and a cover, wherein the cover is formed from a polyurethane-based composition including a prepolymer, a block copolymer, and a coupling agent, and wherein the prepolymer is formed from an isocyanate and a polyol. In one embodiment, the block copolymer includes an olefin-diene-olefin block. In another embodiment, the olefin is styrene and the diene is butadiene. In still another embodiment, the coupling agent includes a hydroxy group, an amino group, a thiol group, an epoxy group, an anhydride group, or a combination thereof. For example, the coupling agent may be selected from the group consisting of trimethylolpropane monoallyl ether; N-methylolacrylamide; 1,1-dihydroxymethylcyclohex-3-ene; 1,2-dihydroxymethylcyclohex-4-ene; 1-amino-ethenol; 1-amino-2-propen-1-ol; 1-amino-1-propen-2-ol; 1-amino-4-penten-2-ol; 1-amino-4-hexen-3-ol; 1-amino-3-penten-2-ol; 1-amino-1-hepten-2-ol; 1-amino-3-nonen-2-ol; 2-amino-ethenol; 2-amino-3-buten-1-ol; 2-amino-4-pentene-1-ol; 2-amino-5-hexen-1-ol; 2-amino-3,14-octadecadien-1-ol; 2-amino-3,8-octadecadien-1-ol; 2-amino-3,9-octadecadien-1-ol; 8-amino-1-octen-4-ol; 4-amino-2-buten-2-ol; 4-amino-1-penten-3-ol; 4-amino-1,5-hexadiene-3-ol; 4-amino-2,5-hexadiene-1-ol; ethynol; 4-amino-2-butyn-1-ol; 1-amino-1-hydroxy-2-butenyl; 1-amino-3-pentyn-2-ol; 1-amino-3-decyn-2-ol; and mixtures thereof. In yet another embodiment, the composition includes crosslinks. In the alternative, the composition can be thermoplastic.

The present invention is also directed to a golf ball including a core and a cover, wherein the cover is formed from a polyurea composition including a prepolymer, a block copolymer including at least one functional group at a terminal end, and a curative, wherein the prepolymer is formed from an isocyanate and a polyamine. The golf ball may further include an intermediate layer disposed between the core and the cover, which may be formed from, at least in part, a thermoplastic material, e.g., an ionomer resin. In this aspect of the invention, the at least one functional group may be selected from the group consisting of a hydroxy group, an amino group, a thiol group, an epoxy group, an anhydride group, and combinations thereof. In one embodiment, the block copolymer includes an $A_x$-$B_y$-$A_z$ block, wherein x, y, and z are independently 1 or greater, and wherein A includes an olefin and B includes a diene. In another embodiment, the block copolymer includes an $A_x$-$B_y$ block, wherein x and y are independently 1 or greater, and wherein A includes an olefin and B includes a diene.

The present invention also relates to a golf ball including a core and a cover, wherein at least a portion of the golf ball is formed from a polyurea composition formed from a prepolymer, an olefin-diene-olefin block copolymer, and a coupling agent. The golf ball may include an intermediate layer formed from a thermoplastic material. Furthermore, the coupling agent may be selected from the group consisting of trimethylolpropane monoallyl ether; N-methylolacrylamide; 1,1-dihydroxymethylcyclohex-3-ene; 1,2-dihydroxymethylcyclohex-4-ene; 1-amino-ethenol; 1-amino-2-propen-1-ol; 1-amino-1-propen-2-ol; 1-amino-4-penten-2- ol; 1-amino-4-hexen-3-ol; 1-amino-3-penten-2-ol; 1-amino-1-hepten-2-ol; 1-amino-3-nonen-2-ol; 2-amino-ethenol; 2-amino-3-buten-1-ol; 2-amino-4-pentene-1-ol; 2-amino-5-hexen-1-ol; 2-amino-3,14-octadecadien-1-ol; 2-amino-3,8-octadecadien-1-ol; 2-amino-3,9-octadecadien-1-ol; 8-amino-1-octen-4-ol; 4-amino-2-buten-2-ol; 4-amino-1-penten-3-ol; 4-amino-1,5-hexadiene-3-ol; 4-amino-2,5-hexadiene-1-ol; ethynol; 4-amino-2-butyn-1-ol; 1-amino-1-hydroxy-2-butenyl; 1-amino-3-pentyn-2-ol; 1-amino-3-decyn-2-ol; and mixtures thereof. In this aspect of the invention, the block copolymer may include styrene-butadiene-styrene block copolymer. Furthermore, the cover may have a thickness of about 0.02 inches to about 0.035 inches. In one embodiment, the cover has an inner cover layer having a hardness of about 50 Shore D to about 70 Shore D and an outer cover layer having a hardness of about 30 Shore D to about 70 Shore D.

The present invention is also directed to a golf ball including a core and a cover, wherein at least a portion of the golf ball is formed from a composition including a prepolymer and a curing agent, wherein the prepolymer is formed from a first prepolymer and a functionalized block copolymer, and wherein the prepolymer includes an $A_x$-$B_y$-$A_z$ block capped by isocyanate end groups, wherein x, y, and z are independently 1 or greater. In this aspect of the invention, the functionalized block copolymer may include at least one functional group selected from the group consisting of hydroxy groups, amino groups, thiol groups, epoxy groups, anhydride groups, and combinations thereof. In one embodiment, the first prepolymer includes an isocyanate and a polyol. In an alternate embodiment, the first prepolymer includes an isocyanate and a polyamine. The curing agent may include a hydroxy-terminated curing agent, an amine-terminated curing agent, or a mixture thereof.

In one embodiment, the $A_x$-$B_y$-$A_z$ block includes olefin-diene-olefin. For example, the olefin-diene-olefin may be styrene-butadiene-styrene. In another embodiment, the portion of the golf ball formed from the composition of the invention has a moisture vapor transmission rate of about 0.01 to about 0.09 g/(m$^2$× day) at 38° C. and 90 percent relative humidity.

The present invention further relates to a golf ball including a core and a cover, wherein the cover is formed from a composition including a prepolymer and an amine-terminated curing agent, wherein the prepolymer is the reaction product of a first prepolymer and a functionalized block copolymer including an $A_x$-$B_y$ block, wherein x and y are independently 1 or greater, and wherein the first prepolymer includes an isocyanate and at least one of an amine-terminated component or a hydroxy-terminated component. In one embodiment, the prepolymer includes the $A_x$-$B_y$ block capped by isocyanate end groups. In another embodiment, the $A_x$-$B_y$ block includes an olefin-diene block. For example, the $A_x$-$B_y$ block may include a styrene-butadiene block. In one embodiment, the cover includes an inner cover layer and an outer cover layer, wherein the inner cover layer includes a thermoplastic material, e.g., ionomer resin. In another embodiment, the functionalized block copolymer includes at least one functional group selected from the group consisting of hydroxy groups, amino groups, thiol groups, epoxy groups, anhydride groups, and combinations thereof.

The present invention is further directed to a golf ball including a core, an intermediate layer, and a cover, wherein the cover is formed from a composition including a prepolymer and a curing agent, wherein the prepolymer includes a first prepolymer and a block copolymer having functional groups at each terminal end, wherein the composition includes a hydrophobic $A_x$-$B_y$ block or hydrophobic $A_x$-$B_y$-$A_z$ block capped between isocyanate groups, and wherein x, y, and z are independently 1 or greater. In one embodiment, the first prepolymer is formed from the reaction product of an isocyanate and an amine-terminated compound or a hydroxy-terminated compound. In an alternate embodiment, the first prepolymer is the reaction product of an isocyanate and an amine-terminated compound.

In this aspect of the invention, the curing agent may be selected from the group consisting of ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof, 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imidobis-propylamine; monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; and mixtures thereof.

In this aspect of the inventon, the $A_x$-$B_y$ block may include a styrene-butadiene block. Likewise, the $A_x$-$B_y$-$A_z$ block may include a styrene-butadiene-styrene block. In one embodiment, the functional groups are selected from the group consisting of hydroxy groups, amino groups, thiol groups, epoxy groups, anhydride groups, and combinations thereof.

The present invention is also directed to a method for forming a golf ball composition including the steps of:
  forming a prepolymer including an isocyanate and at least one of a hydroxy-terminated component or an amine-terminated component;
  providing a block copolymer, wherein the block copolymer includes at least one functional group at a terminal end of the block copolymer;
  reacting excess prepolymer with the block copolymer to form an intermediate prepolymer;
  chain extending the intermediate prepolymer with a curing agent to form a composition including a hydrophobic block capped by isocyanate groups.

In one embodiment, the hydrophobic block includes an $A_x$-$B_y$ block, wherein x and y are independently 1 or greater, and wherein A includes an olefin and B includes a diene. In an alternate embodiment, the hydrophobic block includes an $A_x$-$B_y$-$A_z$ block, wherein x and y are independently 1 or greater, and wherein A includes an olefin and B includes a diene. For example, the olefin may include styrene and the diene may include butadiene. In addition, the step of forming the prepolymer may include forming the reaction product of an isocyanate and an amine-terminated component. The curing agent may be an amine-terminated curing agent.

In this aspect of the invention, the step of providing a block copolymer may further include the steps of:
  providing a block copolymer including an $A_x$-$B_y$ block or $A_x$-$B_y$-$A_z$ block, wherein x, y, and z are independently 1 or greater;
  providing a coupling agent including at least one hydroxy group, amino group, thiol group, epoxy group, anhydride group, or mixture thereof;
  functionalizing the block copolymer with the coupling agent to provide a functionalized block copolymer.

The present invention further relates to a method for forming a golf ball component including the steps of:
  forming a prepolymer including an isocyanate and at least one of a hydroxy-terminated component or an amine-terminated component;
  providing a block copolymer including an $A_x$-$B_y$ block or an $A_x$-$B_y$-$A_z$ block, wherein x, y, and z are independently 1 or greater, and wherein the block copolymer includes at least one functional group at a terminal end of the block copolymer;
  reacting the prepolymer with the block copolymer to form the composition;
  forming the composition into a golf ball component.

In one embodiment, the $A_x$-$B_y$ block includes an olefin-diene block. For example, the olefin-diene block may be styrene-butadiene. In an alternate embodiment, the $A_x$-$B_y$-$A_z$ block includes an olefin-diene-olefin block, e.g., styrene-butadiene-styrene.

In this aspect of the invention, the step of providing a block copolymer may further include the steps of:
  providing a coupling agent including at least one hydroxy group, amino group, thiol group, epoxy group, anhydride group, or mixture thereof;
  functionalizing the block copolymer with the coupling agent to provide a functionalized block copolymer.

In one embodiment, the step of forming a golf ball component includes providing a core and forming the composition about the core. In addition, the step of forming the composition about the core may further include casting the composition.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
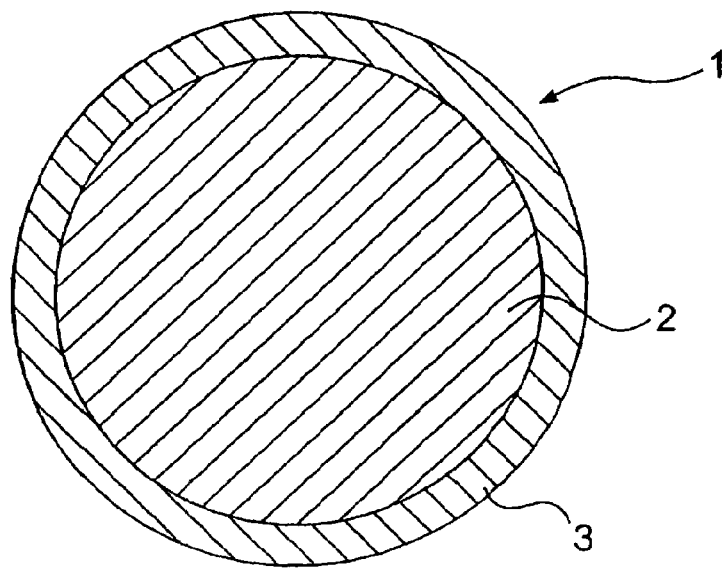
FIG. 1 is a cross-sectional view of a two-piece golf ball, wherein the cover is formed from a composition of the invention.

The present invention contemplates improved light stable and moisture resistant compositions for use in golf equipment, such as golf balls, golf clubs, or the like. In particular, the compositions of the invention preferably include polyurethane-based block copolymers, polyurea-based block copolymers, or mixtures thereof and are included in a variety of golf ball constructions, i.e., one-piece, two-piece, or multilayer balls, as well as golf club components, e.g., club head inserts.

The enhanced light stability of the compositions of the invention enables the production of various golf equipment components with physical and aerodynamic properties better than or equal to golf balls incorporating polyurea or polyurethane compositions without light stable blends.

Light stability may be accomplished in a variety of ways for the purposes of this application. For example, the compositions of the invention may include only saturated components, i.e., components substantially free of unsaturated carbon-carbon bonds or aromatic groups. The term "saturated," as used herein, refers to compositions having saturated aliphatic and alicyclic polymer backbones, i.e., with no carbon-carbon double bonds. The compositions of the invention may also include a light stabilizer to improve light stability when using aromatic components and are preferably saturated. In addition, the use of a composition including a hydrogenated block copolymer enhances the light stability of the compositions. In particular, the use of hydrogenated styrene-butadiene-styrene results in enhanced light stability due to the fact that adding hydrogen causes the double bond to become a single bond.

Furthermore, because conventional polyurethane and polyurea elastomers are prone to absorption of moisture, the present invention provides novel compositions to improve the water resistance of golf equipment compositions. For example, the polyurethane-based and polyurea-based block copolymers of the present invention provide hydrophobicity, in addition to resiliency and durability. In addition, when the elastomers of the invention are based on hydrophobic backbones, the improved moisture resistance of these compositions result in golf equipment with improved stability with respect to its resistance to the absorption of moisture.

Thus, the improved performance characteristics of the golf equipment of the present invention demonstrate a distinct benefit to the golfer by providing golf equipment that exhibits consistent behavior over a wide range of environmental conditions.

Polyurea-Based Compositions

Polyurea-based compositions, which are distinctly different from polyurethane-based compositions, result in desirable aerodynamic and aesthetic characteristics when used in golf equipment and ball components. Conventional aromatic polyurethane/urethane elastomers and polyurethane/urea elastomers are generally prepared by curing a prepolymer of diisocyanate and polyol with at least one diol curing agent or at least one diamine curing agent, respectively. Without being bound to any particular theory, it is now believed that substitution of the long chain polyol segment in the polyurethane prepolymer with a long chain amine-terminated compound to form a polyurea prepolymer, improves shear, cut, and resiliency, as well as adhesion to other components.

As mentioned above, the polyurea-based compositions of the invention provide improved moisture resistance and light stability. The polyurea-based compositions of this invention may be formed in several ways: a) from the reaction product of an isocyanate and amine-terminated compound prepolymer crosslinked with a curing agent; b) from the reaction product of an isocyanate and an amine-functionalized block copolymer; c) from the reaction product of a polyurea-based prepolymer and an amine-functionalized block copolymer; and d) by reacting an excess of a polyurea-based prepolymer and an amine-terminated block copolymer to form an intermediate prepolymer having the block copolymer capped at each end with isocyanate groups, which is cured with a curing agent.

For example, polyurea-based compositions of the invention may be prepared from at least one isocyanate, at least one amine-terminated compound based on a hydrophobic backbone, and at least one diol curing agent or at least one diamine curing agent, preferably a secondary diamine curing agent. The hydrophobic backbone provides increased water resistance. In another aspect, the compositions of the invention include the reaction product of an isocyanate and an amine-functionalized block copolymer, wherein the isocyanate is coupled with the block copolymer at the terminal end. The presence of the rubbery mid-section in the block copolymer, or a hydrogenated moiety, provides both flexibility and hydrophobicity to the composition.

The polyurea-based compositions of the invention may be formed of only saturated components, which have greater light stability, or may include one or more unsaturated components and a light stabilizer. In addition, when the compositions of the invention are formed using a hydrogenated block copolymer, such as hydrogenated styrene-butadiene-styrene, adding hydrogen causes the double bond to become a single bond, which enhances the light stability.

Compositions of the Invention

The compositions of the invention may be formed in several ways. For example, the compositions may be formed from the reaction product of an isocyanate and a functionalized block copolymer. When forming a polyurethane-based composition, the functional groups of the block copolymer are amine groups, whereas the functional groups are hydroxy groups when forming a polyurethane-based composition. In addition, the compositions of the present invention may be formed from the reaction product of a prepolymer, which is based on an isocyanate and a polyol or amine, and a functionalized block copolymer. The compositions of the invention may also be formed by reacting an excess of prepolymer, which is based on an isocyanate and a polyol or amine, with a functionalized block copolymer to form an intermediate prepolymer having the block copolymer portion capped with isocyanate groups at each end, which is then reacted with a curing agent to form a polyurethane-based or polyurea-based composition. Finally, the compositions of the invention may be formed by curing a polyurethane or polyurea prepolymer with an amine-terminated or hydroxy-terminated curing agent.

Such novel compositions are advantageous in that the beneficial properties of the separate polymers are accentuated, while the detrimental qualities are compensated for, or completely overcome. For example, a conventional polyurea or polyurethane composition is moisture sensitive and is not compatible with non-polar polymer layers, but has a good low temperature and scuff resistance. On the other hand, conventional block copolymers, such as styrene-butadiene-styrene (SBS) block copolymers, or their hydrogenated derivatives, are hydrophobic, but lack resiliency, are not compatible with polar polymers, and cause severe delamination when used in golf ball layers. As such, coupling the polyurea prepolymer or polyurethane prepolymer with an SBS block copolymer provides the hydrophobicity of the SBS block copolymer and the scuff resistance of the prepolymer.

In addition, when a polyurea-block SBS, polyurethane-block SBS, or derivative thereof, is used in golf equipment according to the invention, there are several advantages over golf equipment formed from conventional compositions. For example, golf ball components formed from a polyurea-block SBS or a polyurethane-block SBS have improved scuff resistance and resiliency over golf ball components formed from conventional SBS block copolymers due to the urea/urethane moiety. Furthermore, the urea and urethane moieties allow blending with other polar polymers such as polycarbonate, polyester, polyamide, acid copolymers, ionomers, and the like. Also, the presence of diene/olefinic hydrocarbon moiety enables blending with non-polar polymers such as polyethylene, polypropylene, polystyrene, and the like. As such, the adhesion to other polar and non-polar layers is improved over golf ball components formed from conventional compositions. Moreover, the presence of the butadiene moiety, or hydrogenated moiety, provides flexibility and hydrophobicity to the golf ball component.

Reacting an Isocyanate and a Functionalized Block Copolymer

The compositions of the invention may be formed by coupling an isocyanate with a block copolymer. In particular, block copolymers can be functionalized at the terminal end with a hydroxy group or amine group and then reacted with an isocyanate to form a polyurea-based polymer or a polyurethane-based polymer.

Suitable block copolymers for use with the present invention include, but are not limited to, block copolymers having a general $A_xB_y$ block or an $A_xB_yA_z$ block, where x, y, and z represent the chain lengths and are independently 1 or greater. For example, x can be 2, y can be 1, and z can be 2. However, each chain length can be the same or different.

The block copolymer may be an olefin-diene (A-B) block copolymer, such as styrene-butadiene block copolymer, ethylene-butadiene block copolymer, and propylene butadiene block copolymer. In addition, the block copolymer may be an olefin-diene-olefin (A-B-A) block copolymer, such as styrene-butadiene-styrene block copolymer (SBS block copolymer), hydrogenated SBS block copolymer, ethylene-butadiene-ethylene block copolymer, and propylene-butadiene-propylene block copolymer. In an alternative embodiment, the block copolymers of the invention may be acrylic-based, for example, the A in the AB or ABA block may be acrylate.

Those of ordinary skill in the art should be well aware of the general characteristics of block copolymers and the methods for making them. For example, SBS block copolymer is made up of three segments, i.e., two end chains of polystyrene and a middle long chain of polybutadiene, and has the following general structure:

polystyrene group on the same SBS molecule joins another cluster, the different clusters become coupled together with the elastic polybutadiene chains. This gives the SBS block copolymer the ability to retain its shape after being stretched.

Living anionic polymerization, i.e., polymerization without any termination reactions, may be used to make the SBS block copolymers of the invention. The general polymerization process is as follows:

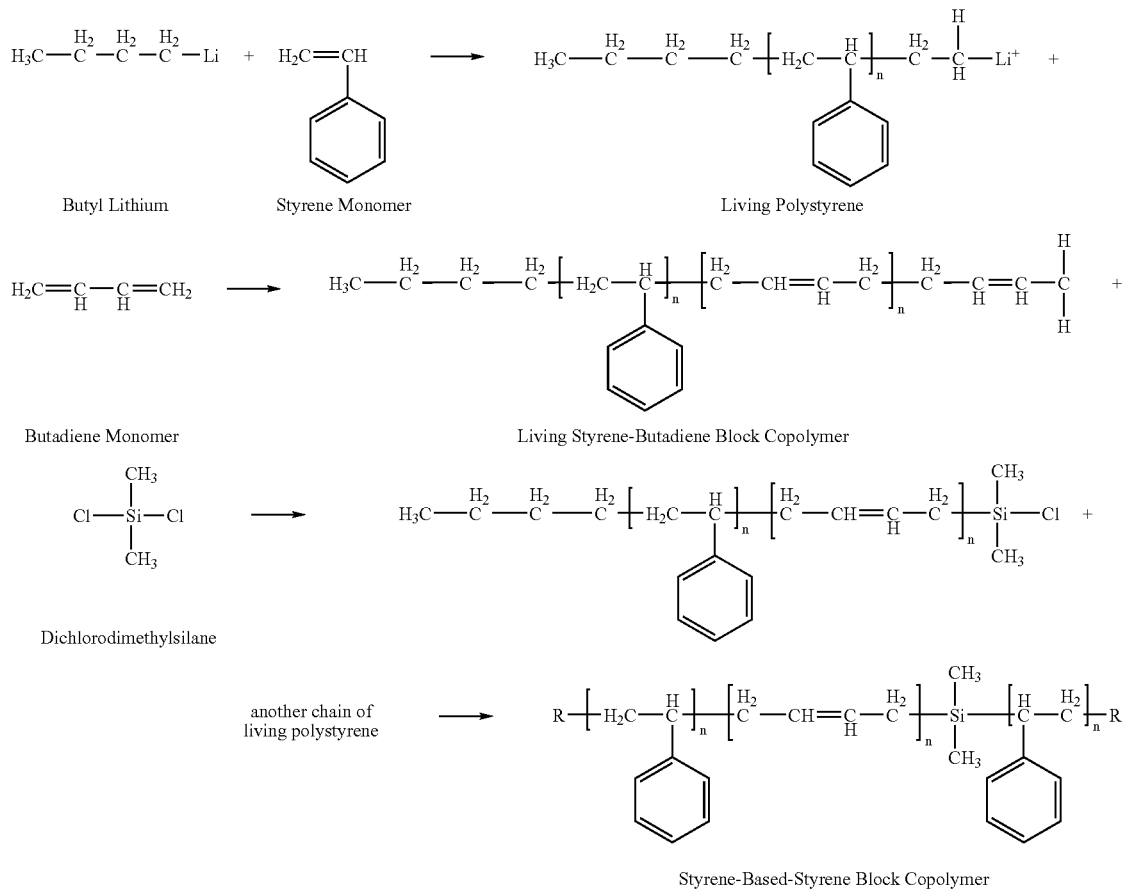

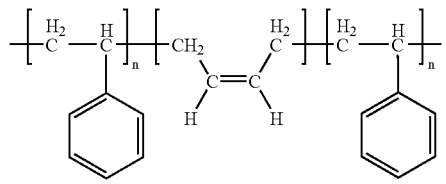

where n is the length of the chain, i.e., 1 or greater. Because polystyrene is a hard plastic, the SBS block copolymer is durable. And, SBS block copolymer has elastomeric properties without being crosslinked, which is different from most rubbers. In addition, the polystyrene chains have a tendency to cluster together so that when one polystyrene group of an SBS molecule joins a cluster, and the other where n is the length, i.e., 1 or greater, and wherein R is a butyl group.

Because the SBS block copolymer, or hydrogenated SBS, does not have functional groups, a coupling agent is needed to functionalize the block copolymer so that it can be reacted with the isocyanate. The coupling agent may be based on the following general structure:

where $R_1$ is any alkyl group including single bonds, double bonds, triple bonds, or a combination thereof and where the terminal groups (R) may be hydroxy groups, amino groups, thiol groups, epoxy groups, anhydride groups, or mixtures thereof. In one embodiment, $R_1$ has about 1 to about 36 carbon atoms, preferably about 1 to about 20 carbons atoms, and more preferably about 1 to about 18 carbon atoms.

Suitable hydroxy-terminated compounds that may be used as coupling agents according to the invention include, but are not limited to, the following:

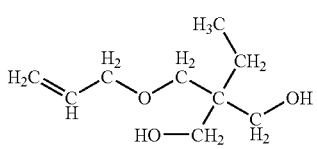

trimethylolpropane monoallyl ether

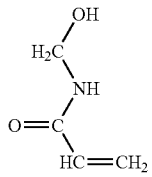

N-methylolacrylamide

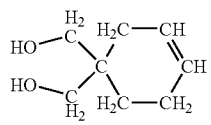

1,1-dihydroxymethylcyclohex-3-ene

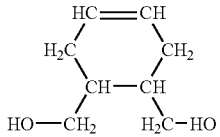

1,2-dihydroxymethylcyclohex-4-ene

As generally addressed above, the coupling agent can also be monoamine and mono-hydroxy-terminated compounds with the following general structure:

$$H_2N-R_1-OH$$

where $R_1$ can be any alkyl group. In one embodiment, $R_1$ has about 1 to about 20 carbon atoms, preferably about 2 to about 20 carbons atoms.

Examples of coupling agents suitable for use with the present invention include, but are not limited to, 1-amino-ethenol; 1-amino-2-propen-1-ol; 1-amino-1-propen-2-ol; 1-amino-4-penten-2-ol; 1-amino-4-hexen-3-ol; 1-amino-3-penten-2-ol; 1-amino-1-hepten-2-ol; 1-amino-3-nonen-2-ol; 2-amino-ethenol; 2-amino-3-buten-1-ol; 2-amino-4-pentene-1-ol; 2-amino-5-hexen-1-ol; 2-amino-3,14-octadecadien-1-ol; 2-amino-3,8-octadecadien-1-ol; 2-amino-3,9-octadecadien-1-ol; 8-amino-1-octen-4-ol; 4-amino-2-buten-2-ol; 4-amino-1-penten-3-ol; 4-amino-1,5-hexadiene-3-ol; 4-amino-2,5-hexadiene-1-ol; ethynol; 4-amino-2-butyn-1-ol; 1-amino-1-hydroxy-2-butenyl; 1-amino-3-pentyn-2-ol; 1-amino-3-decyn-2-ol; and mixtures thereof.

The alkyl group in the coupling agent may contain single bonds, double bonds, or triple bonds. In one embodiment, the alkyl group includes single bonds and double bonds. In another embodiment, the alkyl group includes only single bonds. For example, saturated coupling agents suitable for use with the present invention include, but are not limited to, 1-amino-ethanol, 2-amino-propan-1-ol, 2-amino-butan-4-ol, 3-amino-hexan-4-ol; 4-amino-pentan-1-ol, and mixtures thereof.

Reacting a Prepolymer and a Functionalized Block Copolymer

In another aspect of the invention, the compositions of the invention may be formed by reacting a polyurethane or polyurea prepolymer with a functionalized block copolymer. The functionalized block copolymer may be any of the block copolymers discussed above. The mechanism for the reaction is similar to above in that the functional groups of the block copolymer (obtained by using a coupling agent with the block copolymer) react with the NCO groups of the isocyanate in the prepolymer.

As briefly mentioned above, the prepolymer used in this aspect of the invention may be a polyurethane prepolymer or a polyurea prepolymer. The polyurea prepolymer is the reaction product of an amine-terminated component and an isocyanate, whereas the polyurethane prepolymer is the reaction product of a hydroxy-terminated component and an isocyanate. The particular components of the prepolymers will be discussed in greater detail below.

Because the main difference between the polyurea prepolymer and the polyurethane prepolymer is the amine-terminated component/polyol component, the isocyanates discussed are intended to be used in either type of prepolymer.

Any isocyanate available to one of ordinary skill in the art is suitable for use in the prepolymers according to the invention. Isocyanates for use with the present invention include aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The isocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4''-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1, 3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}MDI$); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

When forming a saturated composition, the following saturated isocyanates are preferably used: ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}MDI$); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea-based composition may be varied to control such factors as the speed of the reaction, the resultant hardness of the composition, and the like. For example, as the weight percent of unreacted isocyanate groups increases, the hardness also increases in a somewhat linear fashion. Thus, when the NCO content is about 10.5 weight percent, the hardness may be less than about 55 Shore A, whereas once the NCO content increases about 15 weight percent, the hardness is greater than about 80 Shore A.

In one embodiment, the number of unreacted NCO groups in the polyurea-based composition may be less than about 14 percent. In one embodiment, the polyurea-based composition has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, the prepolymers may contain about 10 percent to about 20 percent by weight of the prepolymer of free isocyanate monomer. Thus, in one embodiment, the prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

Any amine-terminated compound available to one of ordinary skill in the art is suitable for use in the polyurea prepolymer. The amine-terminated compound may include amine-terminated hydrocarbons, amine-terminated polyethers, amine-terminated polyesters, amine-terminated polycarbonates, amine-terminated polycaprolactones, and mixtures thereof. The amine-terminated segments may be in the form of a primary amine ($NH_2$) or a secondary amine (NHR).

The molecular weight of the amine-terminated compound for use in the invention may range from about 100 to about 10,000. As used herein, the term "about" is used in connection with one or more numbers or numerical ranges, should be understood to refer to all such numbers, including all numbers in a range. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. Because lower molecular weight polyether amines may be prone to forming solid polyureas, a higher molecular weight oligomer may be used to avoid solid formation.

In one embodiment, the amine-terminated compound includes amine-terminated hydrocarbons having the following generic structures:

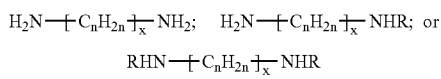

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof.

The amine-terminated compound may also includes amine-terminated polyethers having following generic structures:

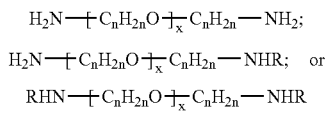

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof. One example of an amine-terminated polyether is a polyether amine. As used herein, "polyether amine" refers to a polyoxyalkyleneamine containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

In one embodiment, the polyether amine has the generic structure:

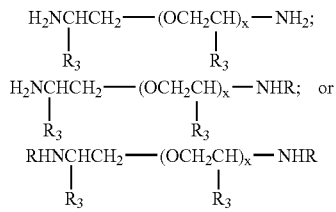

wherein the repeating unit x has a value ranging from about 1 to about 70, R is any alkyl group having from about 1 to about 20 carbon atoms, preferably about 1 to about 12 carbon atoms, a phenyl group, a cyclic group, or mixture thereof, and $R_3$ is a hydrogen, methyl group, or a mixture thereof. Even more preferably, the repeating unit may be from about 5 to about 50, and even more preferably is from about 12 to about 35.

In another embodiment, the polyether amine has the generic structure:

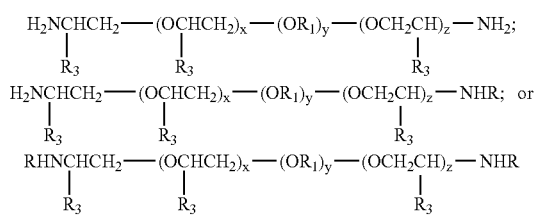

wherein the repeating units x and z have combined values from about 3.6 to about 8 and the repeating unit y has a value ranging from about 9 to about 50, R is an alkyl group having about 1 to about 20 carbons, a phenyl group, a cyclic group, or mixtures thereof, $R_1$ is $-(CH_2)_a-$, wherein "a" may be a repeating unit ranging from about 1 to about 10, a phenylene group, a cyclic group, or mixtures thereof, and $R_3$ is a hydrogen, methyl group, or a mixture thereof.

In yet another embodiment, the polyether amine has the generic structure:

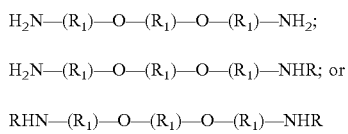

wherein R is an alkyl group having about 1 to about 20 carbons, phenyl groups, cyclic groups, or mixtures thereof, and wherein $R_1$ is $-(CH_2)_a-$, wherein "a" may be a repeating unit ranging from about 1 to about 10, a phenylene group, a cyclic group, or mixtures thereof.

Suitable polyether amines include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is Jeffamine® D2000 (manufactured by Huntsman Corporation of Austin, Tex.).

The molecular weight of the polyether amine for use in the invention may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 4000, preferably about 1000 to about 4000, and more preferably is between about 1500 to about 2500. Because lower molecular weight polyether amines may be prone to forming solid polyureas during prepolymer preparation, a higher molecular weight oligomer, such as Jeffamine® D2000, is preferred.

In addition, the amine-terminated compound may include amine-terminated polyesters having the generic structures:

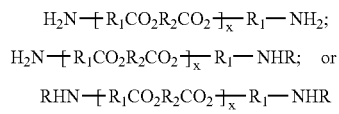

where x is the chain length, i.e., 1 or greater, preferably about 1 to about 20, R is any alkyl group having from about 1 to about 20 carbon atoms, preferably about 1 to about 12 carbon atoms, a phenyl group, a cyclic group, or mixture thereof, and $R_1$ and $R_2$ are straight or branched hydrocarbon chains, e.g., alkyl or aryl chains.

Copolymers of polycaprolactone and polyamines may also be used to form the polyurea prepolymers of the present invention. These copolymers include, but are not limited to, bis(2-aminoethyl)ether initiated polycaprolactone, 2-(2-aminoethylamino)ethanol, 2-2(aminoethylamino)ethanol, polyoxyethylene diamine initiated polycaprolactone, propylene diamine initiated polycaprolactone, polyoxypropylene diamine initiated polycaprolactone, 1,4-butanediamine initiated polycaprolactone, trimethylolpropane-based triamine initiated polycaprolactone, neopentyl diamine initiated polycaprolactone, hexanediamine initiated polycaprolactone, polytetramethylene ether diamine initiated polycaprolactone, and mixtures thereof. In addition, polycaprolactone polyamines having the following structures may be useful in forming the polyurea prepolymers of the present invention:

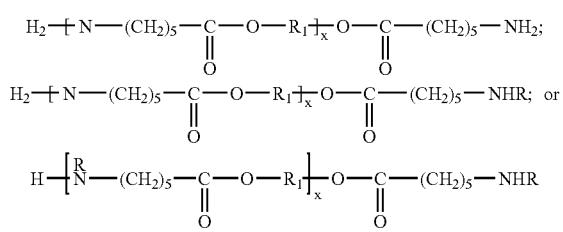

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

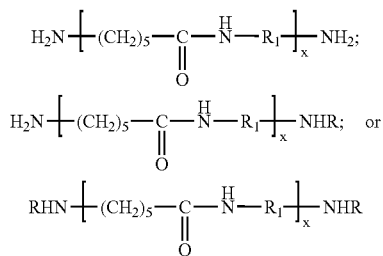

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

In another embodiment, the amine-terminated compound may be an amine-terminated polycarbonate having one of the following generic structures:

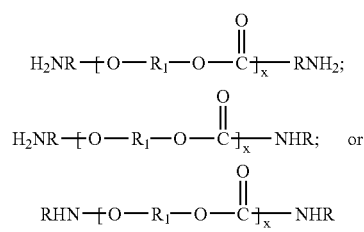

where x is the chain length, which preferably ranges from about 1 to about 20, R is one of an alkyl group having from about 1 to about 20 carbons, preferably about 1 to about 12 carbons, a phenyl group, or a cyclic group, and $R_1$ is a straight chain hydrocarbon or predominantly bisphenol A units or derivatives thereof.

Amine-terminated polyamides may also be reacted with the isocyanate component to form the polyurea prepolymer component of the present invention. Suitable amine-terminated polyamides include, but are not limited to, those having following structures:

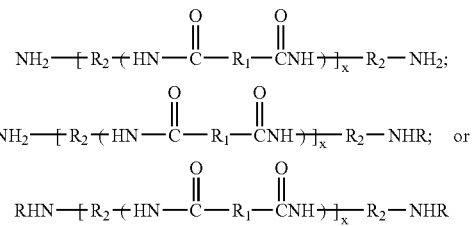

where x is the chain length, i.e., about 1 or greater, R is one of an alkyl group having from about 1 to about 20 carbons, preferably about 1 to about 12 carbons, a phenyl group, or a cyclic group, $R_1$ is an alkyl group having about 1 to about 12 carbon atoms, a phenyl group, or a cyclic group, and $R_2$ is an alkyl group having about 1 to about 12 carbon atoms (straight or branched), a phenyl group, or a cyclic group.

Additional amine-terminated compounds may also be useful in forming the polyurea prepolymers of the present invention include, but are not limited to, poly(acrylonitrile-co-butadiene); poly(1,4-butanediol)bis(4-aminobenzoate) in liquid or waxy solid form; linear and branched polyethylenimine; low and high molecular weight polyethylenimine having an average molecular weight of about 500 to about 30,000; poly(propylene glycol)bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

Thus, in one embodiment, the polyurea prepolymer includes a poly(acrylonitrile-co-butadiene) having one of the following structures:

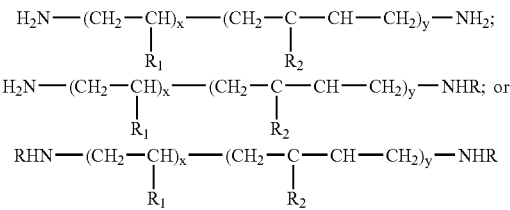

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, $R_1$ is a hydrogen, methyl group, cyano group, phenyl group, or a mixture thereof, and $R_2$ is a hydrogen, a methyl group, chloride, or a mixture thereof. In one embodiment, the y:x ratio is about 82:18 to about 90:10. In other words, the poly(acrylonitrile-co-butadiene) may have from about 10 percent to about 18 percent acrylonitrile by weight.

In another embodiment, the polyurea prepolymer includes a poly(1,4-butanediol) bis(4-aminobenzoate) having one of the following structures:

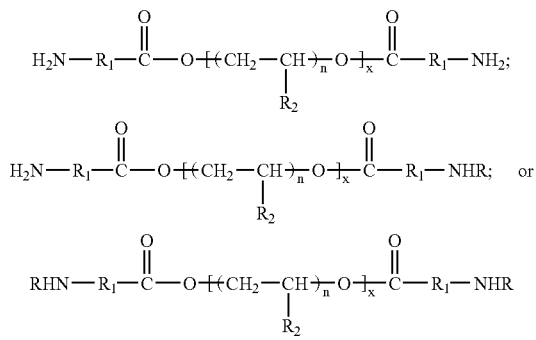

where x and n are chain lengths, i.e., 1 or greater, and n is preferably about 1 to about 12, R and $R_1$ are linear or branched hydrocarbon chains, an alkyl group having from about 1 to about 20 carbons, preferably about 1 to about 12 carbons, a phenyl group, a cyclic group, or mixtures thereof, and $R_2$ is a hydrogen, a methyl group, or a mixture thereof. In one embodiment, $R_1$ is phenyl, $R_2$ is hydrogen, and n is about 2.

In yet another embodiment, the polyurea prepolymer includes at least one linear or branched polyethyleneimine having one of the following structures:

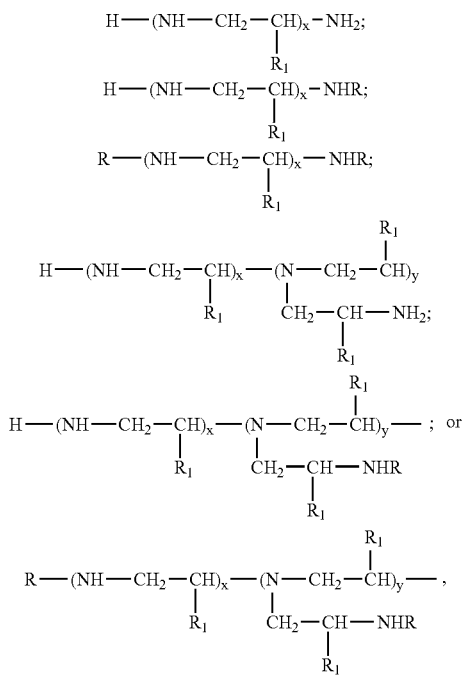

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, and $R_1$ is a hydrogen, methyl group, or a mixture thereof. In one embodiment, $R_1$ is hydrogen. In another embodiment, the polyurea prepolymer includes a mixture of linear and branched polyethyleneimines.

In still another embodiment, the polyurea prepolymer of the present invention includes a polytetrahydrofuran bis(3-aminopropyl) terminated compound having one of the following structures:

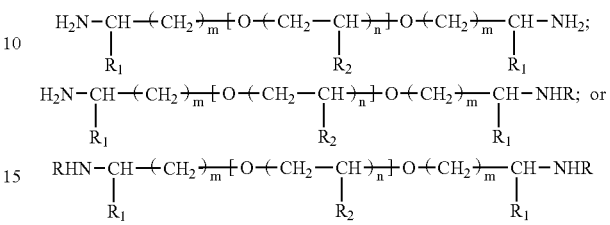

where m and n are chain lengths, i.e., 1 or greater, n is preferably about 1 to about 12 and m is preferably about 1 to about 6, R is any one alkyl group having from about 1 to about 20 carbons, preferably about 1 to about 12 carbons, a phenyl group, a cyclic group, or mixtures thereof, and $R_1$ and $R_2$ are hydrogen, methyl groups, or mixtures thereof. In one embodiment, both $R_1$ and $R_2$ are hydrogen and both m and n are about 2.

In addition, diamines and triamines may be used with an isocyanate to form the polyurea prepolymer of the present invention. In one embodiment, aromatic diamines may be used when an ultraviolet stabilizer or whitening agent is intended to be incorporated during postprocessing. U.S. Pat. No. 5,484,870 provides suitable aromatic diamines suitable for use with the present invention, the entire disclosure of which is incorporated by reference herein. For example, useful aromatic polyamines include polymethylene-di-p-aminobenzoates, polyethyleneglycol-bis(4-aminobenzoate), polytetramethylene etherglycol-di-p-aminobenzoate, polypropyleneglycol-di-p-aminobenzoate, and mixtures thereof. In addition, triamines that may be used in forming the prepolymer of the invention include N,N,N',N'-tetramethyl-ethylenediamine, 1,4-diazobicyclo(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylclyclohexylamine, N,N,N',N'-tetramethyl-1,3-butanediamine, N,N-dimethyl-beta-phenylethylamine, 1,2-dimethylimidazole, and 2-methylimidazole.

The amine-terminated compound may also be blended with additional polyols, as discussed below with respect to the polyurethane prepolymers of the invention, to formulate copolymers that are reacted with excess isocyanate to form the polyurea prepolymer. Once a polyol is used, however, the excess isocyanate in the polyurea prepolymer reacts with the hydroxyl groups in the polyol and forms urethane linkages, which results in a composition that is no longer pure polyurea, but instead a polyurea/urethane composition. Such a composition is distinct from a polyurea composition including only isocyanate, an amine-terminated compound, and a curing agent.

Furthermore, by using an amine-terminated component based on a hydrophobic segment, the polyurea-based compositions of the invention may be more water resistant than those polyurea compositions formed with an amine-terminated hydrophilic segment. Thus, in one embodiment, the amine-terminated compound includes a hydrophobic backbone, e.g., an unsaturated or saturated hydrocarbon-based amine-terminated compound. One example of an amine-terminated hydrocarbon is an amine-terminated polybutadiene.

As briefly mentioned above, a polyurethane prepolymer, according to the present invention, is the reaction product of a polyol and an isocyanate. Any polyol available to one of ordinary skill in the art is suitable for use in the polyurethane prepolymer. Exemplary polyols include, but are not limited to, polyether polyols, polycaprolactone polyols, polyester polyols, polycarbonate polyols, hydrocarbon polyols, and mixtures thereof. Both saturated and unsaturated polyols are suitable for use with the present invention.

Suitable polyether polyols for use in the present invention include, but are not limited to, polytetramethylene ether glycol (PTMEG); copolymer of polytetramethylene ether glycol and 2-methyl-1,4-butane diol (PTG-L); poly(oxyethylene)glycol; poly(oxypropylene)glycol; ethylene oxide capped (polyoxypropylene)glycol; poly(oxypropylene oxyethylene)glycol; and mixtures thereof.

Suitable polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; ortho-phthalate-1,6-hexanediol polyester polyol; polyethylene terephthalate polyester polyols; and mixtures thereof.

Examples of polycarbonate polyols that may be used with the present invention include, but is not limited to, poly (phthalate carbonate)glycol, poly(hexamethylene carbonate) glycol, polycarbonate polyols containing bisphenol A, and mixtures thereof.

Hydrocarbon polyols include, but not limited to, hydroxy-terminated liquid isoprene rubber (LIR), hydroxy-terminated polybutadiene polyol, hydroxy-terminated polyolefin polyols, hydroxy-terminated hydrocarbon polyols, and mixtures thereof.

Other polyols that may be used to form the prepolymer of the invention include, but not limited to, glycerols; castor oil and its derivatives; Polytail H; Polytail HA; Kraton polyols; acrylic polyols; acid functionalized polyols based on a carboxylic, sulfonic, or phosphoric acid group; dimer alcohols converted from the saturated dimerized fatty acid; and mixtures thereof.

By using polyols based on a hydrophobic backbone, the polyurethane compositions of the invention may be more water resistant than those polyurethane compositions having polyols without a hydrophobic backbone. Some non-limiting examples of polyols based on a hydrophobic backbone include hydrocarbon polyols, hydroxy-terminated polybutadiene polyols, polyethers, polycaprolactones, and polyesters.

Once formed the polyurea prepolymer or polyurethane prepolymer may be reacted with a functionalized block copolymer. For example, a polyurea prepolymer formed from an isocyanate and a amine-terminated component may be reacted with a functionalized olefinic block copolymer having the general structure of AB block copolymer or ABA block copolymer such that the functional groups of the block copolymer react with the NCO groups of the prepolymer.

Reacting a Prepolymer and a Functionalized Block Copolymer and Curing Agent

The compositions of the invention may also be formed using the functionalized block copolymers and prepolymer discussed above to form an intermediate prepolymer, which is then cured with a curing agent. For example, excess prepolymer is reacted with a block copolymer having functional groups to form an intermediate prepolymer that has the block inside with the NCO groups on the ends. The polyurea-based composition or polyurethane-based composition is then formed by chain extending the intermediate prepolymer with a single curing agent or a blend of curing agents. The curing agent may be hydroxy-terminated, amine-terminated, or a combination thereof. Both types of curing agents, i.e., hydroxy-terminated and amine curatives, may include one or more saturated, unsaturated, aromatic, and cyclic groups. Additionally, the hydroxy-terminated and amine curatives may include one or more halogen groups.

The type of curing agent used, however, ultimately determines whether the composition of the invention is polyurea/urea, polyurea/urethane, polyurethane/urethane or polyurethane/urea. For example, when a hydroxy-terminated curing agent is reacted with a polyurea prepolymer of the present invention, the excess isocyanate in the polyurea prepolymer reacts with the hydroxyl groups in the curing agent and forms urethane linkages, which results in a composition that is no longer pure polyurea, but instead a polyurea/urethane composition. In addition, a polyurethane prepolymer cured with a hydroxy-terminated curing agent is polyurethane/urethane because any excess isocyanate groups will react with the hydroxyl groups of the curing agent to create more urethane linkages. And, if an amine-terminated curing agent is used with the polyurethane prepolymer, the excess isocyanate groups will react with the amine groups of the amine-terminated curing agent to create urea linkages resulting in polyurethane/urea composition.

Thus, for the purposes of the present invention, a pure polyurea composition, i.e., a polyurea/urea, contains only urea linkages having the following general structure:

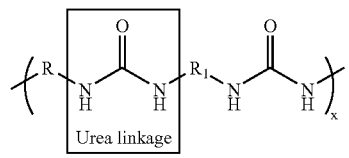

where x is the chain length, i.e., about 1 or greater, and R and $R_1$ are straight chain or branched hydrocarbon chain having about 1 to about 20 carbons. On the other hand, a polyurethane/urethane composition contains only urethane linkages, wherein the urethane linkages have the following general structure:

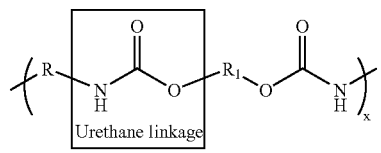

where x is the chain length, i.e., about 1 or greater, and R and $R_1$ are straight chain or branched hydrocarbon chain having about 1 to about 20 carbons. Likewise, a polyurea/urethane composition or polyurethane/urea composition contains both urethane and urea linkages.

Thus, the intermediate prepolymers discussed above may be cured with an amine-terminated component. For example, when the compositions of the invention are polyurea-based, the intermediate prepolymer is formed by 1) forming a polyurea prepolymer from an isocyanate and an amine-terminated component, 2) reacting an excess of the polyurea prepolymer with a functionalized block copolymer to form an intermediate prepolymer having the block inside of two NCO groups, and 3) chain extending the intermediate prepolymer with an amine-terminated curing agent. When forming a polyurea-based composition, the amine-terminated curing agent is preferably a secondary diamine curing agent so that the composition contains only urea linkages.

Suitable amine-terminated curing agents include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl) ether; 2-methylpentamethylenediamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; and mixtures thereof. In one embodiment, the amine-terminated curing agent is 4,4'-bis-(sec-butylamino)-dicyclohexylmethane. In one embodiment, the amine-terminated curing agent may have a molecular weight of about 64 or greater. In another embodiment, the molecular weight of the amine-curing agent is about 2000 or less. In addition, any of the amine-terminated moieties listed above may be used as curing agents to react with the prepolymers.

Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylenediamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropyl-isophorone diamine and mixtures thereof.

In one embodiment, the curatives used with the prepolymer include 3,5-dimethylthio-2,4-toluenediamine,3,5-dimethyl-thio-2,6-toluenediamine, 4,4'-bis-(sec-butylamino)-diphenylmethane, N,N'-diisopropyl-isophorone diamine; polyoxypropylene diamine; propylene oxide-based triamine; 3,3'-dimethyl-4,4'-diaminocyclohexylmethane; and mixtures thereof.

As briefly discussed above, many amines may be unsuitable for reaction with the isocyanate because of the rapid reaction between the two components. In general, unhindered primary diamines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (Clearlink 1000) may be suitable for use in combination with an isocyanate to form the polyurea prepolymer. In addition, N,N'-diisopropyl-isophorone diamine, available from Huntsman Corporation under the tradename Jefflink, may be used as the secondary diamine curing agent.

To further improve the shear resistance of the resulting polyurea elastomers, a trifunctional curing agent can be used to help improve cross-linking. Preferably, a triol such as trimethylolpropane or a tetraol such as N,N, N',N'-tetrakis (2-hydroxylpropyl) ethylenediamine may be added to the formulations.

The intermediate prepolymers of the invention may also be cured with a single hydroxy-terminated curing agent or a mixture of hydroxy-terminated curing agents. As mentioned above, if a hydroxy-terminated curing agent is used with a polyurea prepolymer of the invention, the resulting composition will include both urea and urethane linkages.

Conversely, if a hydroxy-terminated curing agent is used with a polyurethane prepolymer, the resulting composition will include only urethane linkages. For example, when the compositions of the invention are polyurethane-based, the intermediate prepolymer may formed by 1) forming a polyurethane prepolymer from an isocyanate and a polyol or hydroxy-terminated component, 2) reacting an excess of the polyurethane prepolymer with a functionalized block copolymer to form an intermediate prepolymer having the block inside of two NCO groups, and 3) chain extending the intermediate prepolymer with a hydroxy-terminated curing agent.

Suitable hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy) ethoxy]cyclohexane; 1,3-bis-{2-[2-(2-hydroxyethoxy)

ethoxy]ethoxy} cyclohexane; polytetramethylene ether glycol, preferably having a molecular weight ranging from about 250 to about 3900; resorcinol-di-(beta-hydroxyethyl) ether and its derivatives; hydroquinone-di-(beta-hydroxyethyl) ether and its derivatives; 1,3-bis-(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; N,N-bis($\beta$-hydroxypropyl) aniline; 2-propanol-1,1'-phenylaminobis; and mixtures thereof.

The hydroxy-terminated curing agent may have a molecular weight of at least about 50. In one embodiment, the molecular weight of the hydroxy-terminated curing agent is about 2000 or less. In yet another embodiment, the hydroxy-terminated curing agent has a molecular weight of about 250 to about 3900. It should be understood that molecular weight, as used herein, is the absolute weight average molecular weight and would be understood as such by one of ordinary skill in the art.

The saturated hydroxy-terminated curing agents, included in the list above, are preferred when making a light stable composition. Those saturated hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy) ethoxy]ethoxy} cyclohexane; polytetramethylene ether glycol having molecular weight ranging from about 250 to about 3900; and mixtures thereof.

In one embodiment, the curing agent is a modified curative blend as disclosed in co-pending U.S. Patent Publication No. 2003/0212240, which is incorporated by reference herein in its entirety. For example, the curing agent of the invention may be modified with a freezing point depressing agent to create a curative blend with a slower onset of solidification and with storage stable pigment dispersion. A number of amine-terminated curing agents have relatively high freezing points, e.g., hexamethylene diamine (105.8° F.), diethanolamine (82.4° F.), triethanol amine (69.8° F.), diisopropanolamine (73.4° F.), and triisopropanolamine (111.2° F.). Such amine-terminated curing agents may be modified with an amine-terminated freezing point depressing agent or a mixture of amine-terminated freezing point depressing agents. Suitable amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and mixtures thereof.

The freezing point depressing agent is preferably added in an amount sufficient to reduce the freezing point of the curing agent by a suitable amount to prevent loss of pigment dispersion, but not affect the physical properties of the golf ball. In one embodiment, the freezing point depressing agent is added to the curing agent in an amount of about 5 percent or greater by weight of the curative blend, i.e., curing agent(s), freezing point depressing agent. In another embodiment, the freezing point depressing agent is present in an amount of about 8 percent greater by weight of the curative blend. In still another embodiment, the freezing point depressing agent is present in an amount of about 10 percent or greater. In yet another embodiment, the curative blend includes the freezing point depressing agent in an amount of about 12 percent or greater by weight of the curative blend. The curative blend may also include a freezing point depressing agent in an amount of about 14 percent or greater by weight of the curative blend.

In addition, after freezing and subsequent thawing, the modified curative blend of the present invention preferably has a pigment dispersion of greater than 0 on the Hegman scale, preferably about 1 or greater, and more preferably about 2 or greater. In one embodiment, the modified curative blend after a freeze/thaw cycle has a pigment dispersion of about 3 or greater on the Hegman scale. In another embodiment, the modified curative blend after a freeze and thaw is about 4 or greater on the Hegman scale, preferably about 5 or greater. In still another embodiment, the modified curative blend after a freeze and thaw is about 6 or greater on the Hegman scale. In yet another embodiment, the modified curative blend after freezing and thawing is about 7 or greater on the Hegman scale.

Reacting a Prepolymer (or Components Thereof) With a Curing Agent

The compositions of the invention may also be formed by chain extending the polyurea prepolymers or polyurethane prepolymers with any suitable curing agent discussed above. For example, a polyurea-based composition of the invention may be formed by chain extending a polyurea prepolymer with an amine-terminated curing agent, preferably a secondary diamine curing agent. In addition, a polyurethane-based composition of the invention may be formed by chain extending a polyurethane prepolymer with a hydroxy-terminated curing agent.

Furthermore, polyurea/urethane or polyurethane/urea compositions may be formed by using a mixture of curing agents. For example, a polyurea/urethane composition may be formed by chain extending a polyurea prepolymer with a single hydroxy-terminated curing agents or a blend including a hydroxy-terminated curing agent.

There are two basic techniques used to process the compositions of the invention: the one-shot technique and the prepolymer technique. The one-shot technique reacts the isocyanate, the amine-terminated compound or polyol depending on whether the desired resultant composition is polyurea-based or polyurethane-based, and the curing agent in one step, whereas the prepolymer technique requires a first reaction between the amine-terminated compound or polyol and an isocyanate to produce the prepolymer, and a subsequent reaction between the prepolymer and a curing agent. Either method may be employed to produce the polyurea-based and polyurethane-based compositions of the invention, however, the prepolymer technique is preferred because it provides better control of chemical reaction and, consequently, results in more uniform properties for the elastomers.

Depending on the prepolymer to curative ratio, which is a function of the NCO content of the prepolymer and molecular weight of the curing agent, the castable polyurea-based or polyurethane-based compositions of the invention may be thermoset or thermoplastic in nature. For example, castable thermoplastic compositions of the invention include linear polymers and are typically formed curing the prepolymer with a diol or secondary diamine with 1:1 stoichiometry in the absence of moisture. Thermoset compositions of the invention, on the other hand, are cross-linked polymers and are typically produced from the reaction of a diisocyanate and a polyol cured with a primary diamine or polyfunctional glycol. In an alternative embodiment, thermoset polyurethanes may be formed when using a secondary diamine when the prepolymer to curative ratio is less than about 1. For example, the composition may be thermoset polyurethane when the prepolymer to secondary diamine curing agent is 1:0.95.

In addition, skilled artisans are aware that the various properties of the golf ball and golf ball components, e.g., hardness, may be controlled by adjusting the prepolymer-curative ratio. For example, the ratio of a polyurea prepolymer with 6 percent unreacted NCO groups cured with 1,4-butanediol is 15.6:1, whereas the ratio of the same prepolymer cured with 4,4'-bis-(sec-butylamino)-dicyclohexylmethane (Clearlink 1000) is 4.36:1. The ratio of prepolymer to curing agent for the purposes of this invention is preferably from about 0.5:1 to about 16:1.

Because the prepolymer-curative ratio determines whether a composition of the invention will be thermoplastic or thermoset, the method of molding the compositions of the invention onto the ball also will vary depending on the composition. For example, thermoplastic polyurea compositions of the present invention may be used to make thermoplastic pellets that can be molded onto the ball by injection molding or compression molding. Thermoset polyurea compositions may be cast onto the ball. In addition, both the thermoplastic and thermoset polyurea compositions of the present invention also may be formed around the core using reaction injection molding (RIM) and liquid injection molding (LIM) techniques.

Composition Additives

Additional materials conventionally included in polyurethane and polyurea compositions may be added to the polyurethane and polyurea prepolymers, the modified curative blends, or the composite compositions of the invention. These additional materials include, but are not limited to, catalysts, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers, impact modifiers, foaming agents, density-adjusting fillers, reinforcing materials, and compatibilizers may also be added to any composition of the invention. Those of ordinary skill in the art are aware of the purpose of these additives and the amounts that should be employed to fulfill those purposes.

Catalysts

A catalyst may also be employed to promote the reaction between the prepolymer and the curing agent for both the polyurethane and polyurea compositions. Suitable catalysts include, but are not limited to bismuth catalyst; zinc octoate; stannous octoate; tin catalysts such as bis-butyltin dilaurate (DABCO® T-12 manufactured by Air Products and Chemicals, Inc.), bis-butyltin diacetate (DABCO® T-1); stannous octoate (DABCO® T-9); tin (II) chloride, tin (IV) chloride, bis-butyltin dimethoxide (FASCAT®-4211), dimethyl-bis [1-oxonedecyl)oxy] stannane (FORMEZ® UL-28), di-n-octyltin bis-isooctyl mercaptoacetate (FORMEZ® UL-29); amine catalysts such as triethylenediamine (DABCO® 33-LV), triethylamine, and tributylamine; organic acids such as oleic acid and acetic acid; delayed catalysts such as POLYCAT™ SA-1, POLYCAT™ SA-2, POLYCAT™, and the like; and mixtures thereof. In one embodiment, the catalyst is bis-butyltin dilaurate. The catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as bis-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Use of low levels of tin catalysts, typically from about 0 to about 0.04 weight percent of the total composition, requires high temperatures to achieve a suitable reaction rate, which may result in degradation of the prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

Density-Adjusting Filler(s)

Fillers may be added to the polyurethane and polyurea compositions of the invention to affect Theological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Blowing or Foaming Agent(s)

The compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenylmethyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Either injection molding or compression molding may be used to form a layer including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Light Stabilizers

The compositions of the invention may include both saturated and unsaturated components. And, while the use of only saturated components aids in avoiding the yellowing over time that occurs with unsaturated components, the use of various UV absorbers and light stabilizers to any of the above compositions may help to also maintain the tensile strength, elongation, and color stability. The use of light stabilizing components also may assist in preventing cover surface fractures due to photodegradation.

As such, the compositions of the invention may contain at least one light stabilizing component to prevent significant yellowing from unsaturated components contained therein. The use of a light stabilizer is preferred, for instance, for compositions having a difference in yellowness ($\Delta Y$) of about 15 or greater, but also may be added to compositions having a difference in yellowness of from about 12 to about 15. As used herein, light stabilizer may be understood to include hindered amine light stabilizers, ultraviolet (UV) absorbers, and antioxidants.

Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

As discussed above, dyes, as well as optical brighteners and fluorescent pigments may also be included in the golf ball covers produced with polymers formed according to the present invention. Such additional ingredients may be added in any amounts that will achieve their desired purpose.

To further improve the shear resistance and heat resistance of the resulting polyurea elastomers, a multi-functional curing agent can be used to help improve cross-linking. In one embodiment of the present invention, the multi-functional curing agent is modified with a compatible freezing point depressing agent as detailed above. For example, a triol such as trimethylolpropane or a tetraol such as N,N, N',N'-tetrakis(2-hydroxylpropyl) ethylenediamine may be added to the composition. In one embodiment, a primary diamine, such as 3,3'-dimethyl-4,4'-diaminodicyclohexylmethane or 4,4'-diaminodicyclohexylmethane is added to the polyurea composition. Useful triamine curing agents for improving the crosslinking of polyurea elastomers include, but are not limited to: propylene oxide-based triamines; trimethylolpropane-based triamines; glycerin-based triamines; N,N-bis {2-[(aminocarbonyl)amino]ethyl}-urea; N,N',N"-tris(2-aminoethyl)-methanetriamine; N1-(5-aminopentyl)-1,2,6-hexanetriamine; 1,1,2-ethanetriamine; N,N', N"-tris(3-aminopropyl)-methanetriamine; N1-(2-aminoethyl)-1,2,6-hexanetriamine; N1-(10-aminodecyl)-1,2,6-hexanetriamine; 1,9,18-octadecanetriamine; 4,10,16,22-tetraazapentacosane-1,13,25-triamine; N1-{3-[[4-[(3-aminopropyl) amino]butyl]amino]propyl}-1,2,6-hexanetriamine; di-9-octadecenyl-(Z,Z)-1,2,3-propanetriamine; 1,4,8-octanetriamine; 1,5,9-nonanetriamine; 1,9,10-octadecanetriamine; 1,4,7-heptanetriamine; 1,5,10-decanetri amine; 1,8,17-heptadecanetriamine; 1,2,4-butanetriamine; propanetriamine; 1,3,5-pentanetriamine; N1-{3-[[4-[(3-aminopropyl)amino]butyl]amino]propyl}-1,2,6-hexanetriamine; N1-{4-[(3-aminopropyl)amino]butyl}-1,2,6-hexanetriamine; 2,5-dimethyl-1,4,7-heptanetriamine; N1-(6-aminohexyl)-1,2,6-hexanetriamine; 6-ethyl-3,9-dimethyl-3, 6,9-undecanetriamine; 1,5,11-undecanetriamine; 1,6,11-undecanetriamine; N,N-bis(aminomethyl)-methanediamine; N,N-bis(2-aminoethyl)-1,3-propanediamine; methanetriamine; N1-(2-aminoethyl)-N2-(3-aminopropyl)-1,2,5-pentanetriamine; N1-(2-aminoethyl)-1,2,6-hexanetriamine; 2,6, 11-trimethyl-2,6,11-dodecanetriamine; 1,1,3-propanetriamine; 6-(aminomethyl)-1,4,9-nonanetriamine; 1,2,6-hexanetriamine; N2-(2-aminoethyl)-1,1,2-ethanetriamine; 1,3,6-hexanetriamine; N,N-bis(2-aminoethyl)-1,2-ethanediamine; 3-(aminomethyl)-1,2,4-butanetriamine; 1,1, 1-ethanetriamine; N1,N1-bis(2-aminoethyl)1,2-propanediamine; 1,2,3-propanetriamine; 2-methyl-1,2,3-propanetriamine; and mixtures thereof.

Fragrance Components

Some materials used in the polyurea or polyurethane compositions of the invention are odorous in nature or produce odors during reaction with other materials or with oxygen. For example, the odor of curative Ethacure 300 is attributed to dimethyl disulfide (DMDS) once the product reacts with oxygen. As used herein, a material or component is odorous when the odor threshold surpasses a threshold of 0.029 mg/m$^3$ in air. A fragrance or masking component may be added to the compositions of the invention to eliminate odors. The fragrance component is preferably added in an amount of about 0.01 percent to about 1.5 percent by weight of the composition. In one embodiment, the fragrance component is added to the composition in an amount of about 0.03 percent or greater by weight of the composition. In another embodiment, the fragrance component is added to the composition in an amount of about 1.2 percent or less by weight of the composition. In yet another embodiment, the fragrance component is added in an amount of about 0.5 percent to about 1 percent by weight of the composition. For example, an optimum loading of the fragrance component may be about 0.08 percent by weight of the composition, but adding more may enhance the effect if needed.

Suitable fragrance components include, but are not limited to, Long Lasting Fragrance Mask #59672, Long Lasting Fragrance Mask #46064, Long Lasting Fragrance Mask #55248, Non-Descript Fragrance Mask #97779, Fresh and Clean Fragrance Mask #88177, and Garden Fresh Fragrance Mask #87473, all of which are manufactured by Flavor and Fragrance Specialties of Mahwah, N.J. Other non-limiting examples of fragrance components that may be added to the compositions of the invention include benzaldehyde, benzyl benzoate, benzyl propionate, benzyl salicylate, benzyl alcohol, cinnamic aldehydes, natural and essential oils derived from botanical sources, and mixtures thereof.

Composition Blends

The compositions of the invention preferably include from about 1 percent to about 100 percent polyurea-based polymers or polyurethane-based polymers, however, the compositions may also be blended with other materials. In one embodiment, the composition contains about 10 percent to about 90 percent polyurea-based polymer or polyurethane-based polymer, preferably from about 10 percent to about 75 percent polyurea-based polymer or polyurethane-based polymer, and contains about 90 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

The polyurea-based compositions and polyurethane-based compositions of the invention may also be in the form of a blend with at least one highly neutralized polymer. For example, a prepolymer can be chain extended with a curing agent and then blended with a highly neutralized polymer. Suitable highly neutralized polymers include, but are not limited to, polymers containing α,β-unsaturated carboxylic acid groups, or the salts thereof, that have been highly neutralized by organic fatty acids. The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic, or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending). The acid moieties of the highly-neutralized polymers ("HNP"), typically ethylene-based ionomers, are preferably neutralized greater than about 70 percent, more preferably greater than about 90 percent, and most preferably at least about 100 percent.

Acid Functionalization of Compositions

The present invention also contemplates the acid functionalization of the polyurethane and polyurea compositions of the invention as disclosed in U.S. Pat. No. 6,610,812, which is incorporated by reference herein in its entirety. The acid functional group is preferably based on a sulfonic group ($HSO_3$), carboxylic group ($HCO_2$), phosphoric acid group ($H_2PO_3$), or a combination thereof. More than one type of acid functional group may be incorporated into the polyurea or polyurethane.

Golf Ball Core Layer(s)

The cores of the golf balls formed according to the invention may be solid, semi-solid, hollow, fluid-filled or powder-filled, one-piece or multi-component cores. The term "semi-solid" as used herein refers to a paste, a gel, or the like. Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. As mentioned above, the polyurethane or polyurea compositions of the present invention may also be incorporated into any component of a golf ball, including the core. For example, a core layer may contain at least one of the polyurea/urea compositions, polyurea/urethane compositions, polyurethane/urethane compositions, or polyurethane/urea compositions of the invention.

In one embodiment, the golf ball core is formed from a composition including a base rubber (natural, synthetic, or a combination thereof), a crosslinking agent, and a filler. In another embodiment, the golf ball core is formed from a reaction product that includes a cis-to-trans catalyst, a resilient polymer component having polybutadiene, a free radical source, and optionally, a crosslinking agent, a filler, or both. Various combinations of polymers, cis-to-trans catalysts, fillers, crosslinkers, and a source of free radicals, such as those disclosed in co-pending U.S. Patent Publication No. 2003/0119989, the entire disclosure of which is incorporated by reference herein, may be used to form the reaction product. Although this polybutadiene reaction product is discussed in a section pertaining to core compositions, the present invention also contemplates the use of the reaction product to form at least a portion of any component of a golf ball.

As used herein, the terms core and center are generally used interchangeably to reference the innermost component of the ball. In some embodiments, however, the term "center" is used when there are multiple core layers, i.e., a center and an outer core layer.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from any of the polyurethane-based and polyurea-based compositions discussed above.

The intermediate layer(s) may also likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of Philadelphia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the intermediate layer includes polymers, such as ethylene, propylene, butene-1 or hexene-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof. For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. Patent Publication No. 2003/0078348, the entire disclosure of which is incorporated by reference herein. Another example of a polyamide-nonionomer blend is a polyamide and non-ionic polymers produced using non-metallocene single-site catalysts. Examples of suitable single-site catalyzed polymers are disclosed in co-pending U.S. Pat. No. 6,476,130, of which the entire disclosure is incorporated by reference herein.

Golf Ball Cover(s)

The cover provides the interface between the ball and a club. Properties that are desirable for the cover are good moldability, high abrasion resistance, high impact resistance, high tear strength, high resilience, and good mold release, among others.

The cover layer may be formed, at least in part, from at least one of the polyurethane-based or polyurea-based compositions of the invention. For example, a cover layer may be formed of a polyurea-based composition that includes styrene-butadiene-styrene block copolymer.

The cover layer(s) may also be formed from composition blends as discussed above. For example, in one embodiment, at least one cover layer is formed from a blend of about 10 percent to about 90 percent of a polyurea-based material, preferably saturated, and about 90 percent to about 10 percent other polymers and/or other materials. In another embodiment, at least one cover layer is formed from a blend of about 10 percent to about 90 percent of a polyurethane-based material, preferably saturated, and about 90 percent to about 10 percent other polymers and/or other materials. In yet another embodiment, the cover compositions include from about 10 percent to about 75 percent of a polyurea-based or polyurethane-based material and about 90 percent to about 25 percent other polymers and/or other materials, such as those listed below.

When the polyurethane-based and polyurea-based compositions of the invention are incorporated into a core or intermediate/inner cover layer, the cover compositions may include one or more homopolymeric or copolymeric materials as discussed in the section above pertaining to the intermediate layer. The cover may also be at least partially formed from the polybutadiene reaction product discussed above with respect to the core.

As discussed elsewhere herein, the composition may be molded onto the golf ball in any known manner, such as by casting, compression molding, injection molding, reaction injection molding, or the like. One skilled in the art would appreciate that the molding method used may be determined at least partially by the properties of the composition. For example, casting may be preferred when the material is thermoset, whereas compression molding or injection molding may be preferred for thermoplastic compositions.

Golf Ball Construction

The compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, intermediate layer, and/or cover of a golf ball, each of which may have a single layer or multiple layers. As used herein, the term "multilayer" means at least two layers.

As described above in the core section, a core may be a one-piece core or a multilayer core, both of which may be solid, semi-solid, hollow, fluid-filled, or powder-filled. A multilayer core is one that has an innermost component with an additional core layer or additional core layers disposed thereon. For example, FIG. 1 shows a golf ball 1 having a core 2 and a cover 3. In one embodiment, the golf ball of FIG. 1 represents a core 2 of polybutadiene reaction material or other conventional materials and a cover 3 including the polyurea-based composition of the invention. In another embodiment, the golf ball of FIG. 1 represents a core 2 formed from polybutadiene reaction material and a cover 3 including the polyurethane-based composition of the invention.

In addition, when the golf ball of the present invention includes an intermediate layer, this layer may be incorporated with a single or multilayer cover, a single or multi-piece core, with both a single layer cover and core, or with both a multilayer cover and a multilayer core. The intermediate layer may be an inner cover layer or outer core layer, or any other layer(s) disposed between the inner core and the outer cover of a golf ball. As with the core, the intermediate layer may also include a plurality of layers. It will be appreciated that any number or type of intermediate layers may be used, as desired.

Figure 2:
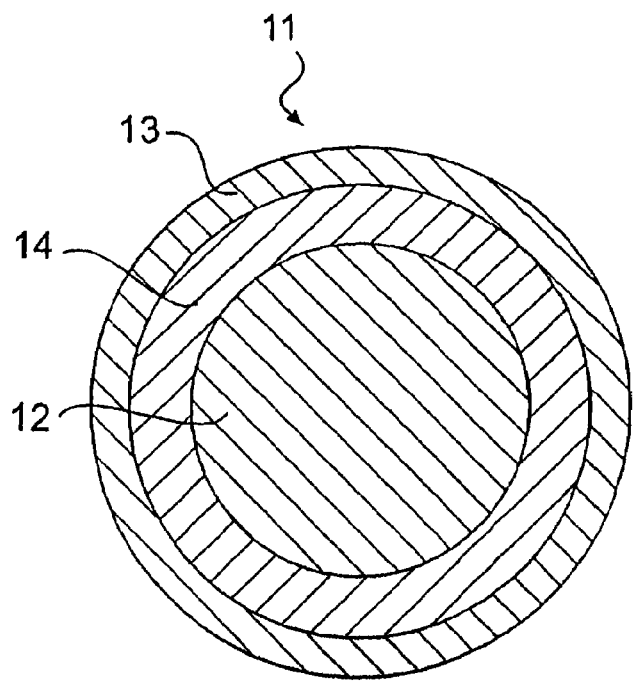
FIG. 2 is a cross-sectional view of a multi-component golf ball, wherein at least the cover is formed from a composition of the invention.
Figure 3:
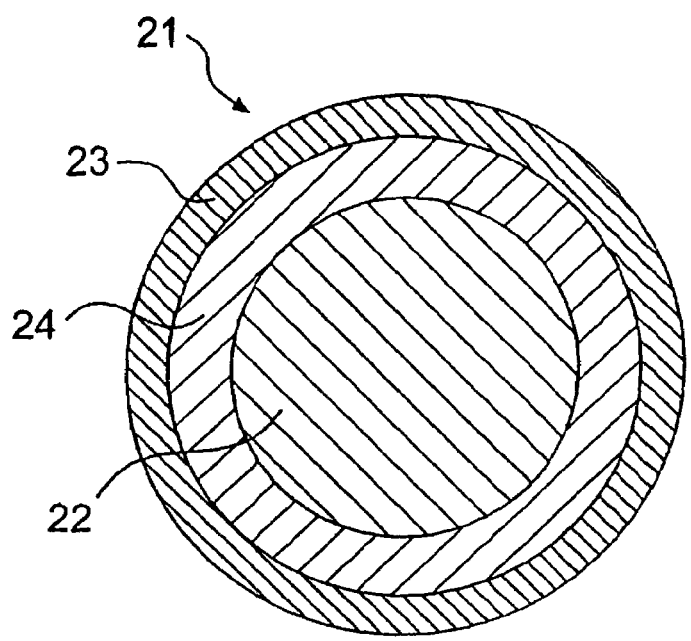
FIG. 3 is a cross-sectional view of a multi-component golf ball, wherein the cover is formed from a composition of the invention and the intermediate layer is formed from a composition including a thermoplastic material.

FIG. 2 illustrates a multilayer golf ball 11, including a cover 13, at least one intermediate layer 14, and a core 12. In one embodiment, the golf ball 11 of FIG. 2 may include a core 12 of polybutadiene reaction material, an intermediate layer 14, and a cover 13 formed of the polyurea-based composition of the invention. In addition, the golf ball 21 of FIG. 3 has a core 22 of polybutadiene reaction material or other conventional core materials, at least one intermediate layer 24, and cover 23 including at least one polyurethane-based material of the present invention. In one embodiment, the intermediate layer 14 is formed of an ionomeric material.

Figure 4:
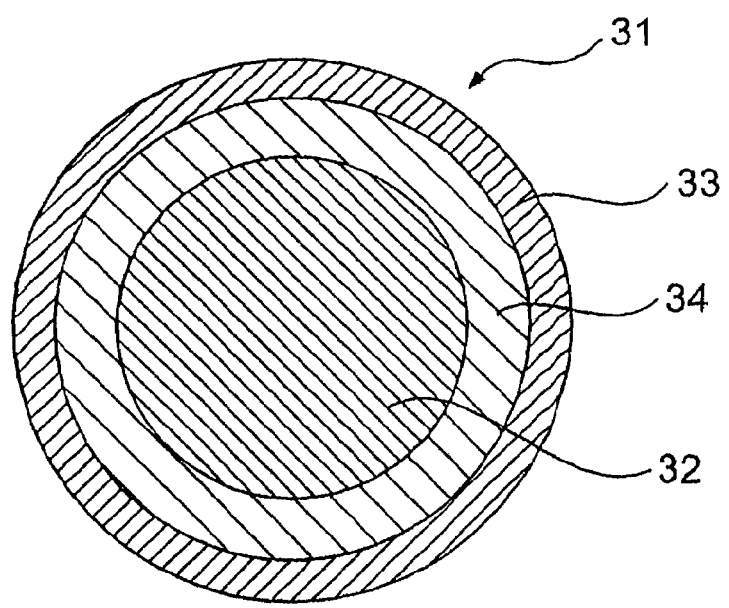
FIG. 4 is a cross-sectional view of a multi-component golf ball including a core and a cover, wherein the core is surrounded by a tensioned elastomeric material and the cover is formed from a composition of the invention.

The intermediate layer may also be a tensioned elastomeric material wound around a solid, semi-solid, hollow, fluid-filled, or powder-filled center. As used herein, the term "fluid" refers to a liquid or gas and the term "semi-solid" refers to a paste, gel, or the like. A wound layer may be described as a core layer or an intermediate layer for the purposes of the invention. As an example, the golf ball 31 of FIG. 4 may include a core layer 32, a tensioned elastomeric layer 34 wound thereon, and a cover layer 33. In particular, the golf ball 31 of FIG. 4 may have a core 32 made of a polybutadiene reaction product, an intermediate layer including a tensioned elastomeric material 34 and cover 33 including at least one polyurea-based or polyurethane-based composition of the invention. The tensioned elastomeric material may be formed of any suitable material known to those of ordinary skill in the art.

Figure 5:
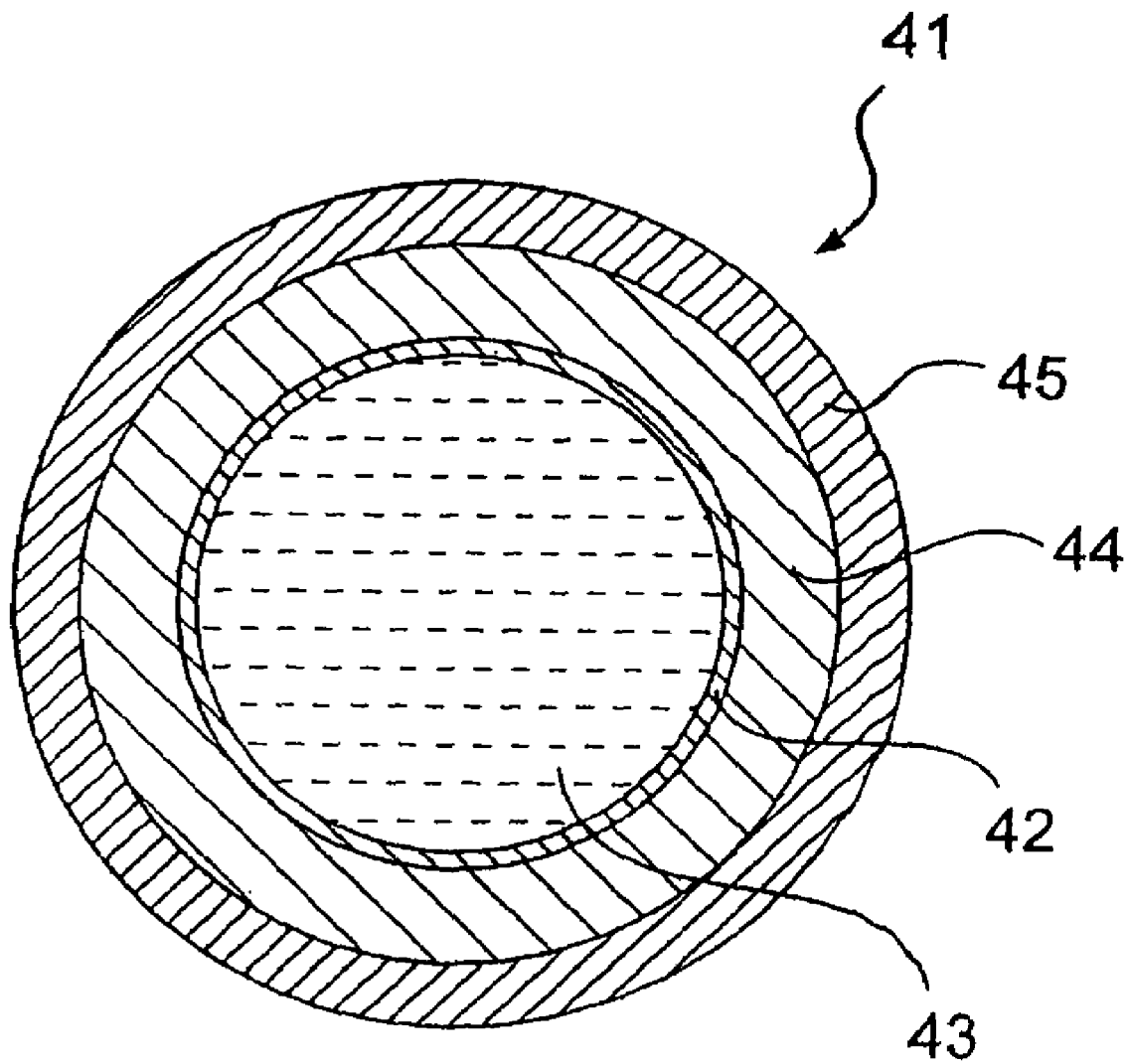
FIG. 5 is a cross-sectional view of a liquid center golf ball wherein the liquid core is surrounded by a tensioned elastomeric material and the cover is formed from a composition of the invention.

In yet another embodiment, the golf ball 41 of FIG. 5 has a hollow spherical core shell 42 with its hollow interior filled with a liquid 43, a thread rubber layer including a tensioned elastomeric material 44 and a cover 45 including at least one polyurea-based or polyurethane-based composition of the invention.

Figure 6:
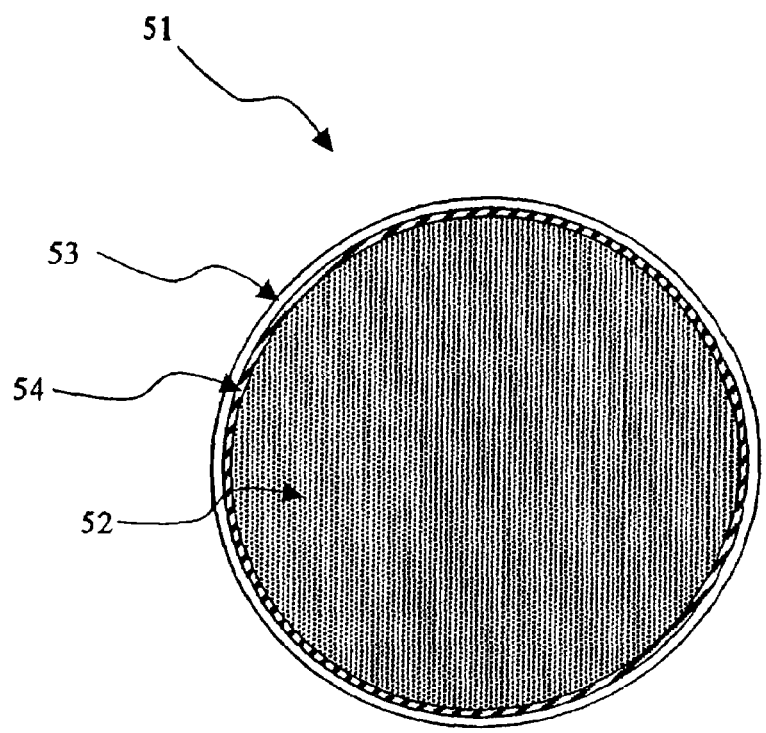
FIG. 6 is a cross-sectional view of a multi-component golf ball including a core, a thin inner cover layer, and a thin outer cover layer disposed thereon, wherein the cover is formed from a composition of the invention.
Figure 7:
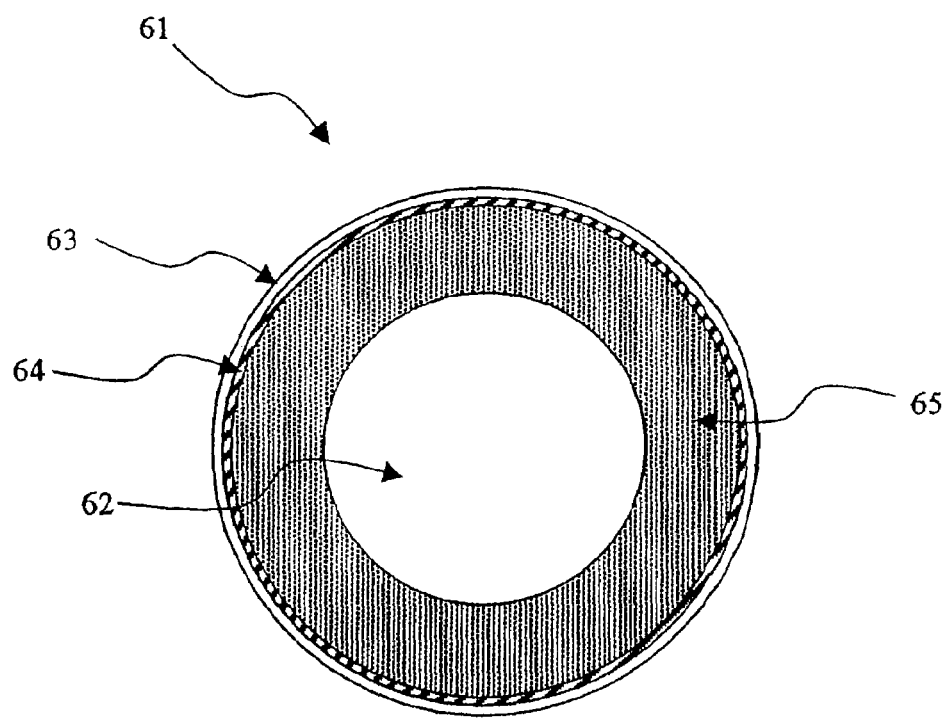
FIG. 7 is a cross-sectional view of a multi-component golf ball including a core, an outer core layer, a thin inner cover layer, and a thin outer cover layer disposed thereon, wherein the cover is formed from a composition of the invention.

Likewise, the cover may include a plurality of layers, e.g., an inner cover layer disposed about a golf ball center and an outer cover layer formed thereon. For example, FIG. 6 may represent a golf ball 51 having a core 52, a thin inner cover layer 54, and a thin outer cover layer 53 disposed thereon. In particular, the core 51 may be formed of a polybutadiene reaction material, the inner cover layer 54 formed of an ionomer blend, and the outer cover layer 53 formed of the polyurea-based or polyurethane-based compositions of the invention. In addition, FIG. 7 may represent a golf ball 61 having a core 62, an outer core layer 65, a thin inner cover layer 64, and a thin outer cover layer 63 disposed thereon. In one embodiment, the core 62 and the outer core layer 65 are formed of the polybutadiene reaction material but differ in hardness, the inner cover layer 64 is formed of an ionomer blend, and the outer cover layer 63 is formed of a polyurea-based or polyurethane-based composition of the invention.

Figure 8:
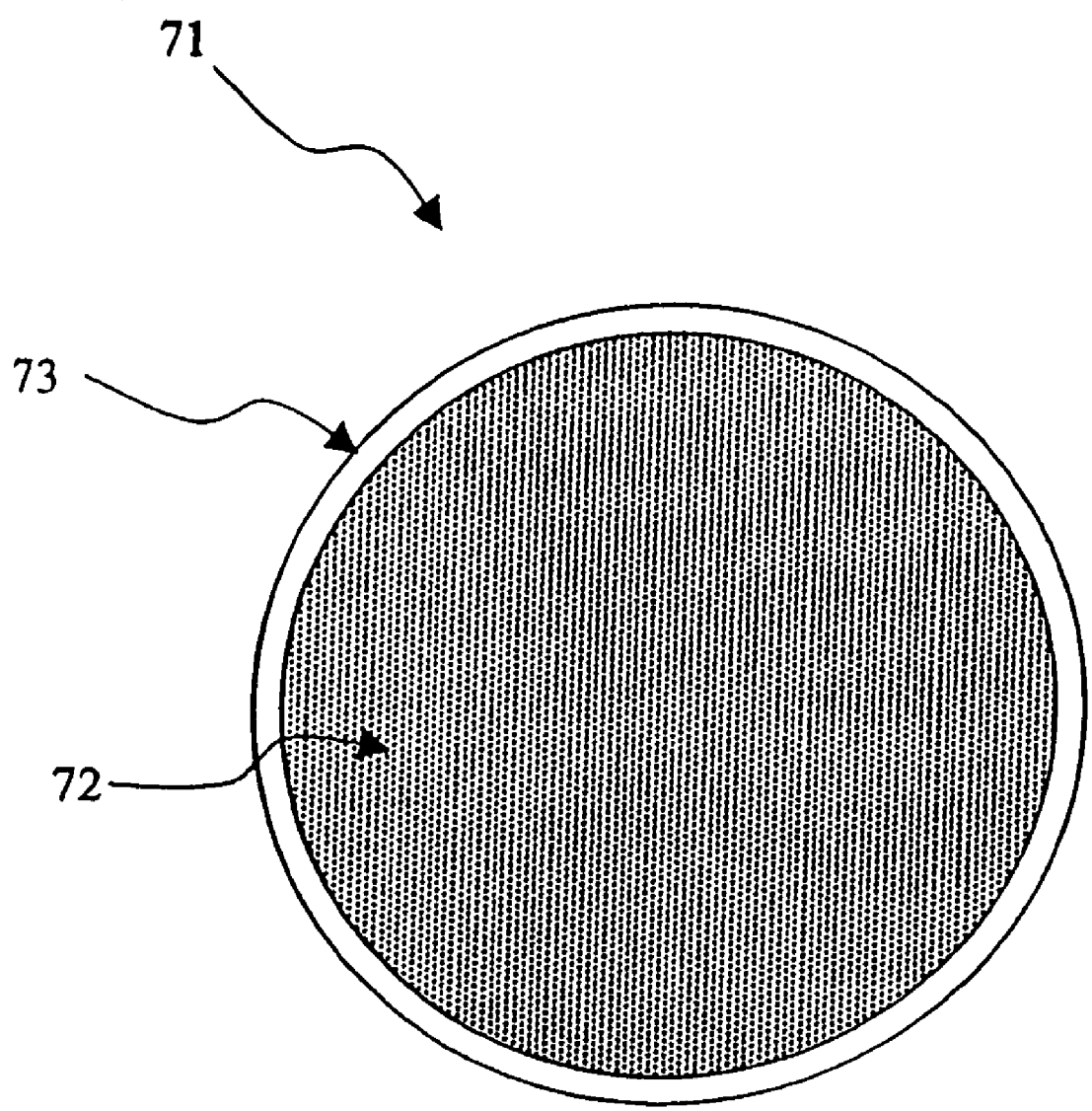
FIG. 8 is a cross-sectional view of a multi-component golf ball including a large core and a thin outer cover layer disposed thereon, wherein the cover is formed from a composition of the invention.

Furthermore, the compositions of the invention may be used to form a golf ball 71, shown in FIG. 8, having a large core 72 and a thin outer cover layer 73. In one embodiment, the large core 72 is formed of a polybutadiene reaction material and the thin outer cover layer 73 is formed of a polyurea-based or polyurethane-based composition of the invention.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. Patent Publication No. 2003/0232666, the entire disclosure of which is incorporated by reference herein.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

The polyurea-based and polyurethane-based materials of the invention may be applied over the inner ball using a variety of application techniques such as spraying, compression molding, dipping, spin coating, casting, or flow coating methods that are well known in the art. In one embodiment, the polyurea-based or polyurethane-based materials are formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane-based cover on a golf ball core. Because this method relates to the use of both casting thermosetting and thermoplastic material as the golf ball cover, wherein the cover is formed around the core by mixing and introducing the material in mold halves, the polyurea-based compositions may also be used employing the same casting process.

For example, once the polyurea-based composition or polyurethane-based composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in a motorized mixer inside a mixing head by metering amounts of the curative and prepolymer through the feed lines. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting prepolymer and curing agent introduced therein to commence gelling.

Similarly, U.S. Pat. No. 5,006,297 and U.S. Pat. No. 5,334,673 both also disclose suitable molding techniques that may be utilized to apply the polyurea-based and polyurethane-based compositions of the invention. However, the method of the invention is not limited to the use of these techniques; other methods known to those skilled in the art may also be employed. For instance, other methods for holding the ball core may be utilized instead of using a partial vacuum.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. Patent Publication No. 2003/0158001, which is incorporated by reference herein.

The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball so as to provide a high degree of surface coverage. In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein.

Several additional non-limiting examples of dimple patterns with varying sizes of dimples are also provided in U.S. Pat. Nos. 6,358,161 and 6,213,898, the entire disclosures of which are incorporated by reference herein.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. Patent Publication No. 2003/0114255, which is incorporated in its entirety by reference herein, is contemplated for use with the golf balls of the present invention.

Golf Ball Post-Processing

The golf balls of the present invention may be painted, coated, or surface treated for further benefits. For example, golf balls covers frequently contain a fluorescent material and/or a dye or pigment to achieve the desired color characteristics. A golf ball of the invention may also be treated with a base resin paint composition. In addition, the golf ball may be coated with a composition including a whitening agent.

In one embodiment, the golf balls of the invention may be UV cured. Suitable methods for UV curing are disclosed in U.S. Pat. Nos. 6,500,495, 6,248,804, and 6,099,415, the entire disclosures of which are incorporated by reference herein. In one embodiment, the top coat is UV curable. In another embodiment, the ink is UV curable and may be used as a paint layer or as a discrete marking tool for logos and indicias.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. Patent Publication No. 2003/0106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

The use of the polyurea-based and polyurethane-based compositions in golf equipment may reduce, or completely obviate, the need for typical post-processing, e.g., coating a golf ball with a pigmented coating prior to applying a clear topcoat to the ball. Unlike compositions with no light stable properties, the compositions used in forming the golf equipment of the present invention do not discolor upon exposure to light (especially in the case of extended exposure). Also, by eliminating at least one coating step, the manufacturer realizes economic benefits in terms of reduced process times and consequent improved labor efficiency. Further, significant reduction in volatile organic compounds ("VOCs"), typical constituents of paint, may be realized through the use of the present invention, offering significant environmental benefits.

Thus, while it may not be necessary to use pigmented coating on the golf balls of the present invention when formed with the compositions of the invention, the golf balls of the present invention may be painted, coated, or surface treated for further benefits. For example, the value of golf balls made according to the invention and painted offer enhanced color stability as degradation of the surface paint occurs during the normal course of play. The mainstream technique used nowadays for highlighting whiteness is to form a cover toned white with titanium dioxide, subjecting the cover to such surface treatment as corona treatment, plasma treatment, UV treatment, flame treatment, or electron beam treatment, and applying one or more layers of clear paint, which may contain a fluorescent whitening agent. This technique is productive and cost effective.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer of such a golf ball is between about 0.02 inches and about 0.045 inches. In still another embodiment, the outer cover layer is about 0.025 to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Spin Rate

As known to those of ordinary skill in the art, the spin rate of a golf ball will vary depending on the golf ball construction. In a multilayer ball, e.g., a core, an intermediate layer, and a cover, wherein the cover is formed from the polyurea or polyurethane compositions of the invention, the spin rate of the ball off a driver ("driver spin rate") is preferably about 2700 rpm or greater. In one embodiment, the driver spin rate is about 2800 rpm to about 3500 rpm. In another embodiment, the driver spin rate is about 2900 rpm to about 3400 rpm. In still another embodiment, the driver spin rate may be less than about 2700 rpm.

Two-piece balls made according to the invention may also have driver spin rates of 2700 rpm and greater. In one embodiment, the driver spin rate is about 2700 rpm to about 3300 rpm. Wound balls made according to the invention may have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

Adhesion Strength

The adhesion, or peel, strength of the compositions of the invention is preferably about 5 lb/in or greater. In one embodiment, the adhesion strength is about 25 lb/in or less. For example, the adhesion strength is preferably about 10 lb/in or more and about 20 lb/in or less. In another embodiment, the adhesion strength is about 20 lb/in or greater, preferably about 24 lb/in or greater. In yet another embodiment, the adhesion strength is about 26 lb/fin or greater. In still another embodiment, the adhesion strength is about 20 lb/in to about 30 lb/in.

Skilled artisans are aware of methods to determine adhesion strength. For example, cross-hatch tests and repeated ball impact tests are useful to determine the adhesion strength of a particular layer of a golf ball. The cross-hatch test consists of cutting the material into small pieces in mutually perpendicular directions, applying a piece of adhesive cellophane tape over the material, rapidly pulling off the tape, and counting the number of pieces removed. The repeated impact test consists of subjecting the finished golf ball to impact repeatedly and visually examining the coating film for peeling from the golf ball. Examples of these methods are provided in U.S. Pat. No. 5,316,730, which is incorporated by reference herein.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

MVTR of a golf ball, or portion thereof, may be about 2 $g/(m^2 \times day)$ or less, such as about 0.45 to about 0.95 $g/(m^2 \times day)$, about 0.01 to about 0.9 $g/(m^2 \times day)$ or less, at 38° C. and 90 percent relative humidity.

Shear/Cut Resistance

The cut resistance of a golf ball cover may be determined using a shear test having a scale from 1 to 9 assessing damage and appearance. In one embodiment, the damage rank is preferably about 3 or less, more preferably about 2 or less. In another embodiment, the damage rank is about 1 or less. The appearance rank of a golf ball of the invention is preferably about 3 or less. In one embodiment, the appearance rank is about 2 or less, preferably about 1 or less.

Light Stability

The light stability of the cover may be quantified by the difference in yellowness index ($\Delta YI$), i.e., yellowness measured after a predetermined exposure time—yellowness before exposure. In one embodiment, the $\Delta YI$ is about 10 or less after 5 days (120 hours) of exposure, preferably about 6 or less after 5 days of exposure, and more preferably about 4 or less after 5 days of exposure. In one embodiment, the $\Delta YI$ is about 2 or less after 5 days of exposure, and more preferably about 1 or less after 5 days of exposure. The difference in the b chroma dimension ($\Delta b^*$, yellow to blue) is also a way to quantify the light stability of the cover. In one embodiment, the $\Delta b^*$ is about 4 or less after 5 days (120 hours) of exposure, preferably about 3 or less after 5 days of exposure, and more preferably about 2 or less after 5 days of exposure. In one embodiment, the $\Delta b^*$ is about 1 or less after 5 days of exposure.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Saturated Polyurethane Golf Ball Cover

Table 3 illustrates the components used to make a saturated polyurethane golf ball cover composition.

TABLE 3

| COMPOSITION | |
|---|---|
| Chemicals | Weight (g) |
| $H_{12}$MDI Prepolymer* | 458.73 |
| 1,4-Butanediol | 42.75 |
| HCC-19584 Color Dispersion** | 17.55 |

*Prepolymer is the reaction product of 4,4'-dicyclohexylmethane diisocyanate and polytetramethylene ether glycol.
**HCC-19584 is a white-blue color dispersion manufactured by the PolyOne Corporation (formerly the Harwick Chemical Corporation)

A golf ball was made having the cover formulated from the composition above following the teachings of U.S. Pat. No. 5,733,428. The physical properties and the ball performance results are listed in Table 4.

TABLE 4

| PHYSICAL PROPERTIES | |
|---|---|
| Physical Properties | Present Invention |
| Cover Hardness | 54 |
| Weight (g) | 45.58 |
| Compression | 89 |
| Shear Resistance | Good |
| Color Stability | Comparable to SURLYN ® |

The molded balls from the above composition listed in Table 4 were further subject to a QUV test as described below:

Method:

ASTM G 53-88 "Standard Practice for Operating Light and Water-Exposure Apparatus (Fluorescent UV-Condensation Type) for Exposure of Nonmetallic Materials" was followed with certain modifications as described below:

Six balls of each variety under evaluation were placed in custom made golf ball holders and inserted into the sample rack of a Q-PANEL model OUV/SER Accelerated Weathering Tester manufactured by Q-Panel Lab Products of Cleveland, Ohio. The sample holders were constructed such that each ball was approximately 1.75 inches from an UVA-340 bulb, at its closest point. The weathering tester was then cycled every four hours between the following two sets of conditions (for the specified total length of time 24, 48, and 120 hours):

| Condition #1: | water bath temperature of about 50° C. with the UV lamps on, set and controlled at an irradiance power of 1.00 $W/m^2/nm$. |
| Condition #2: | water bath temperature of about 40° C. with the UV lamps turned off. |

Color was measured before weathering and after each time cycle using a BYK-Gardner Model TCS II sphere type Spectrophotometer equipped with a 25-mm port. A D65/10° illumination was used in the specular reflectance included mode.

The test results for the molded balls after 24 hours of UV exposure are tabulated in Table 5, wherein ΔL* equals the difference in L dimension (light to dark), Δa* equals the difference in the a chroma dimension (red to green), Δb* equals the difference in the b chroma dimension (yellow to blue), ΔC* equals the combined chroma difference (a* and b* scales), hue and saturation, ΔH* equals the total hue difference, excluding effects of saturation and luminescence, ΔE* equals the total color difference, ΔWI equals the difference in the whiteness index, and ΔYI and the difference in the yellowness index.

TABLE 5

UV STABILITY DATA

| Sample | ΔL* | Δa* | Δb* | ΔC* | ΔH* | ΔE* | ΔWI (E313) | ΔYI (D1925) |
|---|---|---|---|---|---|---|---|---|
| Molded Aliphatic Polyurethane | −0.21 | −0.30 | 1.54 | −1.26 | −0.94 | 1.58 | −9.07 | 2.99 |
| Molded Aromatic Polyurethane | −17.27 | 11.36 | 46.14 | 47.31 | 4.36 | 50.56 | −142.35 | 93.80 |
| Molded SURLYN ® | −0.39 | −0.25 | 0.91 | −0.76 | −0.55 | 1.02 | −6.19 | 1.69 |

The test results for the molded balls after 48 hours of UV exposure are illustrated in Table 6.

TABLE 6

UV STABILITY DATA

| Sample | ΔL* | Δa* | Δb* | ΔC* | ΔH* | ΔE* | ΔWI (E313) | ΔYI (D1925) |
|---|---|---|---|---|---|---|---|---|
| Molded Aliphatic Polyurethane | −0.48 | −0.37 | 2.54 | −2.02 | −1.59 | 2.61 | −15.16 | 4.98 |
| Molded Aromatic Polyurethane | −23.46 | 15.01 | 42.75 | 45.18 | 3.44 | 51.02 | −127.75 | 98.96 |
| Molded SURLYN ® | −0.54 | −0.39 | 1.43 | −1.18 | −0.91 | 1.58 | −9.50 | 2.66 |

The test results for the molded balls after 120 hours of UV exposure are illustrated in Table 7.

TABLE 7

UV STABILITY DATA

| Sample | ΔL* | Δa* | Δb* | ΔC* | ΔH* | ΔE* | ΔWI (E313) | ΔYI (D1925) |
|---|---|---|---|---|---|---|---|---|
| Molded Aliphatic Polyurethane | −0.92 | −0.46 | 5.87 | −3.01 | −5.06 | 5.96 | −33.72 | 11.68 |
| Molded Aromatic Polyurethane | −30.06 | 16.80 | 33.37 | 37.29 | 2.11 | 47.95 | −107.12 | 94.42 |
| Molded SURLYN ® | −0.99 | −0.85 | 4.06 | −2.91 | −2.96 | 4.26 | −24.88 | 7.73 |

Example 2

$H_{12}$MDI Polyether Urea Cured with Diol

A golf ball was made having the cover formulated from a composition including a prepolymer formed of $H_{12}$MDI and polyoxyalkylene, having a molecular weight of about 2000, cured with 1,4-butanediol. The physical properties and the ball performance results are listed in Table 8. A golf ball similar to Example 1, a light stable, aliphatic polyurethane, was used for comparison purposes.

TABLE 8

PHYSICAL PROPERTIES

| Ball Properties/Ball Types | Aliphatic Polyurethane Control | Invention |
|---|---|---|
| Nameplate Average | 1.686 | 1.684 |
| Equator Average | 1.684 | 1.683 |
| Weight Average, oz | 1.599 | 1.595 |
| Compression Average | 86 | 86 |
| COR @ 125 ft/sec | 0.807 | 0.805 |
| Cold Crack Test, 5° F. | no failure | no failure |
| Light Stability (5 Days QUV Test) | | |
| $\Delta YI$ | 3.2 | 0.8 |
| $\Delta b^*$ | 1.7 | 0.4 |
| Live Golfer Shear Test* | | |
| Damage Rank | 3 | 2 |
| Appearance Rank | 3 | 2 |

*Rating of Shear Test: Based on a scale of 1–9, 1 is the best, 9 is the worst.

Example 3

$H_{12}$MDI Polyether Urea Cured with a Diamine

A golf ball was made having the cover formulated from a composition including a prepolymer formed of $H_{12}$MDI and polyoxyalkylene, having a molecular weight of about 2000, cured with 4,4'-bis-(sec-butylamino)-dicyclohexylmethane (Clearlink 1000). The physical properties and the ball performance results are listed in Table 9. A golf ball similar to Example 1, a light stable, aliphatic polyurethane, was used for comparison purposes.

TABLE 9

PHYSICAL PROPERTIES

| Ball Properties/Ball Types | Light Stable Polyurethane Control | Invention |
|---|---|---|
| Nameplate Average | 1.683 | 1.686 |
| Equator Average | 1.681 | 1.684 |
| Weight Average, oz | 1.597 | 1.600 |
| Compression Average | 89 | 92 |
| COR @ 125 ft/sec | 0.807 | 0.815 |
| Cold Crack Test, 5° F. | no failure | no failure |
| Light Stability (5 Days QUV Test) | | |
| $\Delta YI$ | 4.3 | 0.6 |
| $\Delta b^*$ | 2.4 | 0.3 |

TABLE 9-continued

PHYSICAL PROPERTIES

| Ball Properties/Ball Types | Light Stable Polyurethane Control | Invention |
|---|---|---|
| Live Golfer Shear Test* | | |
| Damage Rank | 3 | 1 |
| Appearance Rank | 3 | 1 |

*Rating of Shear Test: Based on a scale of 1–9, 1 is the best, 9 is the worst.

Example 4

$H_{12}$MDI Amine-Terminated Compound Urea Cured with a Diamine

A golf ball according to the invention may be made having a cover formed from a composition including a prepolymer formed of $H_{12}$MDI and an amine-terminated compound, such as amine-terminated polybutadiene, cured with N,N'-diisopropyl-isophorone diamine (JEFFLINK® 754, available from Huntsman Corporation). The physical properties and the ball performance results are listed in Table 9. A control golf ball similar to Example 1, a light stable, aliphatic polyurethane, may be used for comparison purposes. The golf ball of the invention, when compared to the control ball, preferably has a better damage rank and appearance rank, as well as improved light stability after a 5-day QUV test, while still maintaining a higher COR.

Example 5

Moisture Resistance of Invention Golf Balls

The moisture resistance of a golf ball of the invention was measured as compared to a control golf ball. The cover for the invention golf ball was formed from a composition including a prepolymer of MDI and hydroxy terminated polybutadiene prepolymer cured with 4,4-bis-(secbutylamino)diphenylmethane (UNILINK® 4200, available as from Huntsman Corporation).

Figure 9:
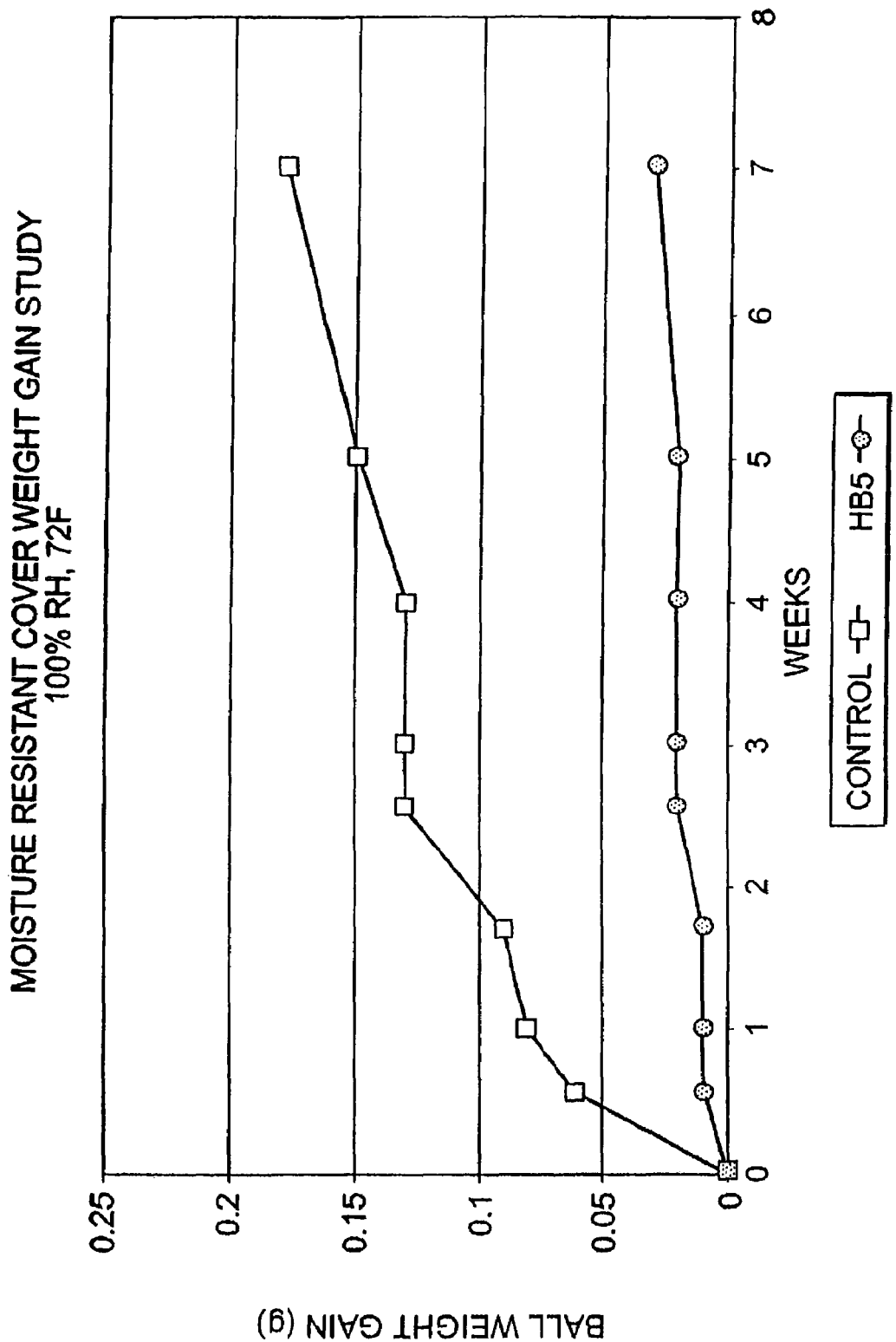
FIG. 9 is a graphical representation of the weight changes of golf balls subjected to controlled temperature and humidity over a specified amount of time.
Figure 10:
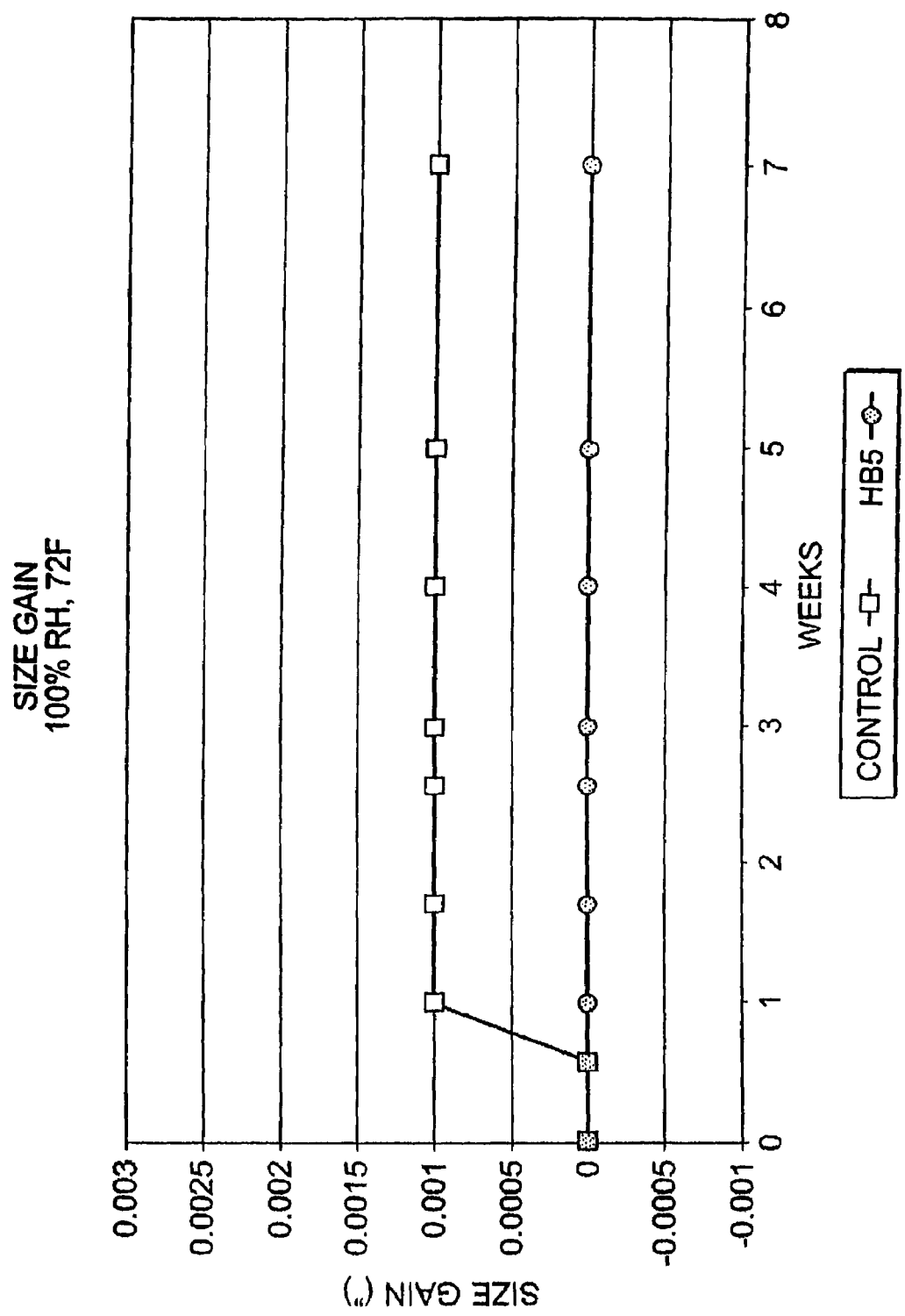
FIG. 10 is a graphical representation of the size changes of golf balls subjected to controlled temperature and humidity over a specified amount of time.

The covers were molded on 1.580 inches wound balls, and were finished with a conventional coating. The golf balls were incubated in a 50 percent relative humidity and 72° F. environmental chamber for one week, and then weighed and measured. These conditioned balls of the invention were then subjected to a 100 percent relative humidity and 72° F. environmental chamber. Weight and size changes were monitored over a period of 7 weeks. The results of the tests are tabulated below (Tables 10 and 11) and illustrated graphically in FIGS. 9 and 10.

TABLE 10

WEIGHT GAIN(G) OF URETHANE COVERED BALLS OVER TIME

| Ball Type | 4 days | 1 week | 1 week + 5 days | 2 weeks + 4 days | 3 weeks | 4 weeks | 5 weeks | 7 weeks |
|---|---|---|---|---|---|---|---|---|
| Control | +0.06 g | +0.08 g | +0.09 g | +0.13 g | +0.13 g | +0.13 g | +0.15 g | +0.18 g |
| Invention | +0.01 g | +0.01 g | +0.01 g | +0.02 g | +0.02 g | +0.02 g | +0.02 g | +0.03 g |

TABLE 11

SIZE GAIN (INCHES) OF URETHANE COVERED BALLS OVER TIME

| Ball Type | 4 days | 1 week | 1 week + 5 days | 2 weeks + 4 days | 3 weeks | 4 weeks | 5 weeks | 7 weeks |
|---|---|---|---|---|---|---|---|---|
| Control | 0 | +0.001 in. | +0.001 in. | +0.001 in. | +0.001 in. | +0.001 in. | +0.001 in. | +0.001 in. |
| Invention | 0 | 0 | 0 | 0 | 0 | 0 | 0 | 0 |

Example 6

Water Resistant Polyurea-Covered Golf Balls

Golf balls may be made according to the invention using a solid core, an intermediate layer, and a cover formed of a water resistant polyurea composition. In particular, the covers may be formed from the reaction product of a polyurea prepolymer and a curing agent.

The polyurea prepolymer may be formed from an isocyanate, e.g., H$_{12}$MDI, and an amine-terminated compound having a hydrophobic backbone, e.g., an amine-terminated polybutadiene. The curing agent may be a secondary diamine, such as 4,4'-bis-(sec-butylamino)-dicyclohexylmethane (UNILINK® 4200, available as from Huntsman Corporation), N,N'-diisopropyl-isophorone diamine (JEFFLINK® 754, available from Huntsman Corporation), or mixtures thereof.

Control balls are preferably formed using the same core and intermediate layer materials, but using a polyurethane composition that includes a polyol without a hydrophobic backbone. Both the invention golf balls and the control golf balls may be incubated in a 50 percent relative humidity and 72° F. environmental chamber for one week, and then weighed and measured. These balls may then be subjected to a 100 percent relative humidity and 72° F. environmental chamber. Weight and size changes may then be monitored over a period of 7 weeks.

The water-resistant polyurea-covered golf balls, when compared to the control balls, will have better water resistance. For example, the golf balls of the invention may have a weight gain of about 75 percent less than the control golf balls after seven weeks, preferably about 80 percent less weight gain than the control balls. Likewise, the golf balls of the invention preferably have no size gain after seven weeks, whereas the control golf balls, as shown above in Example 5, Table 11, have a size gain of 0.001 inches.

Example 6

Golf Balls Formed from Polyurethane-Based Compositions Incorporating Block Copolymers Golf balls may be made according to the invention using a solid core, an intermediate layer, and a cover formed of a polyurethane-based composition of the invention incorporating a block copolymer. In particular, the covers may be formed from the reaction product of a polyurethane prepolymer, a block copolymer, a coupling agent, and a curing agent.

The polyurethane prepolymer may be formed from an isocyanate, e.g., H$_{12}$MDI, and a hydroxy-terminated compound. The polyurethane prepolymer may be incorporated at the terminal end of a block copolymer, such as SBS block copolymer, using a coupling agent. After the prepolymer is coupled with the SBS block copolymer, the compound may be cured using a hydroxy-terminated curing agent or an amine-terminated curing agent.

Example 7

Golf Balls Formed from Polyurea-Based Compositions Incorporating Block Copolymer Golf balls may be made according to the invention using a solid core, an intermediate layer, and a cover formed of a polyurea-based composition of the invention incorporating a block copolymer. In particular, the covers may be formed from the reaction product of a polyurea prepolymer, a block copolymer, a coupling agent, and a curing agent.

The polyurea prepolymer may be formed from an isocyanate, e.g., H$_{12}$MDI, and an amine-terminated compound. The polyurea prepolymer may be incorporated at the terminal end of a block copolymer, such as SBS block copolymer, using a coupling agent. After the prepolymer is coupled with the SBS block copolymer, the compound may be cured using an amine-terminated curing agent, e.g., a secondary diamine, such as 4,4'-bis-(sec-butylamino)-dicyclohexylmethane (UNILINK® 4200, available as from Huntsman Corporation), N,N'-diisopropyl-isophorone diamine (JEFFLINK® 754, available from Huntsman Corporation), or mixtures thereof.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A method for forming a golf ball composition comprising the steps of:
    forming a prepolymer comprising an isocyanate and at least one of a hydroxy-terminated component or an amine-terminated component;
    providing a block copolymer, wherein the block copolymer comprises at least one functional group at a terminal end of the block copolymer;
    reacting excess prepolymer with the block copolymer to form an intermediate prepolymer comprising a hydrophobic block and isocyanate groups;
    chain extending the intermediate prepolymer with a curing agent to form the composition.

2. The method of claim 1, wherein the hydrophobic block comprises an $A_x$-$B_y$ block, wherein x and y are independently 1 or greater, and wherein A comprises an olefin and B comprises a diene.

3. The method of claim 2, wherein the olefin comprises styrene and the diene comprises butadiene.

4. The method of claim 1, wherein the hydrophobic block comprises an $A_x$-$B_y$-$A_z$ block, wherein x and y are independently 1 or greater, and wherein A comprises an olefin or an acrylate and B comprises a diene.

5. The method of claim 4, wherein the olefin comprises styrene and the diene comprises butadiene.

6. The method of claim 1, wherein the step of providing a block copolymer further comprises the steps of:
    providing a block copolymer comprising an $A_x$-$B_y$ block or $A_x$-$B_y$-$A_z$ block, wherein A comprises an olefin or acrylate, B comprises a diene, and x, y, and z are independently 1 or greater;
    providing a coupling agent comprising at least one hydroxy group, amino group, thiol group, epoxy group, anhydride group, or mixture thereof;
    functionalizing the block copolymer with the coupling agent to provide a functionalized block copolymer.

7. The method of claim 1, wherein the step of forming the prepolymer comprises forming the reaction product of an isocyanate and an amine-terminated component.

8. The method of claim 1, wherein the curing agent is an amine-terminated curing agent.

9. A method for forming a golf ball component comprising the steps of:
    forming a prepolymer comprising an isocyanate and at least one of a hydroxy-terminated component or an amine-terminated component;
    providing a block copolymer comprising an acrylate-diene block, an olefin-diene-acrylate block, an acrylate-diene-acrylate block, or a mixture thereof wherein the block copolymer comprises at least one functional group at a terminal end of the block copolymer;
    reacting the prepolymer with the block copolymer to form the composition;
    forming the composition into a golf ball component.

10. The method of claim 9, wherein the block comprises an acrylate-diene block.

11. The method of claim 10, wherein the diene comprises butadiene.

12. The method of claim 9, wherein the diene comprises butadiene.

13. The method of claim 12, wherein the olefin is selected from the group consisting of ethylene, propylene, styrene, and mixtures thereof.

14. The method of claim 9, wherein the step of providing a block copolymer further comprises the steps of:
    providing a coupling agent comprising at least one hydroxy group, amino group, thiol group, epoxy group, anhydride group, or mixture thereof,
    functionalizing the block copolymer with the coupling agent to provide a functionalized block copolymer.

15. The method of claim 9, wherein the step of forming the composition into a golf ball component comprises providing a core and forming the composition about the core.

16. The method of claim 15, wherein the step of forming the composition about the core comprises casting the composition.

17. A method for forming a golf ball component comprising the steps of:
    forming a prepolymer comprising an isocyanate and at least one of a hydroxy-terminated component or an amine-terminated component;
    providing a block copolymer comprising an Ax-By-Az block and at least one functional group at a terminal end of the Ax-By-Az block, and wherein the Ax-By-Az block comprises an olefin-diene-acrylate block or an acrylate-diene-acrylate block, wherein x, y, and z are independently 1 or greater;
    reacting the prepolymer with the block copolymer to form the composition;
    forming the composition into a golf ball component.

18. The method of claim 17, wherein the step of providing a block copolymer further comprises:
    providing a coupling agent comprising at least one hydroxy group, amino group, thiol group, epoxy group, anhydride group, or mixture thereof,
    functionalizing the block copolymer with the coupling agent to provide a functionalized block copolymer.

19. The method of claim 17, wherein the step of forming the prepolymer further comprises obtaining a reaction product of an isocyanate and an amine-terminated component.

20. The method of claim 17, wherein the prepolymer consists essentially of urea linkages.

* * * * *